(12) United States Patent
Bone et al.

(10) Patent No.: US 10,025,066 B1
(45) Date of Patent: Jul. 17, 2018

(54) OCULAR OPTICAL SYSTEM

(71) Applicant: Genius Electronic Optical Co., Ltd., Taichung (TW)

(72) Inventors: Matthew Bone, Fujian (CN); Huifeng Pan, Fujian (CN); Guangyun Li, Fujian (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/414,632

(22) Filed: Jan. 25, 2017

(30) Foreign Application Priority Data

Jan. 11, 2017 (CN) .......................... 2017 1 0021203

(51) Int. Cl.
*G02B 13/00* (2006.01)
*G02B 9/00* (2006.01)
*G02B 25/00* (2006.01)
*G02B 27/00* (2006.01)
*G02B 9/34* (2006.01)
*G02B 27/22* (2018.01)

(52) U.S. Cl.
CPC ............ *G02B 13/004* (2013.01); *G02B 9/00* (2013.01); *G02B 9/34* (2013.01); *G02B 13/00* (2013.01); *G02B 25/001* (2013.01); *G02B 27/0025* (2013.01); *G02B 27/2228* (2013.01)

(58) Field of Classification Search
CPC .. G02B 13/004; G02B 13/0015; G02B 13/00; G02B 9/34; G02B 9/00; G02B 25/001; G02B 27/0025; G02B 27/2228
USPC ................. 359/771, 772, 780, 644
See application file for complete search history.

(56) References Cited

U.S. PATENT DOCUMENTS

| | | | | |
|---|---|---|---|---|
| 5,986,816 A | * | 11/1999 | Shikama .............. | G02B 25/001 359/644 |
| 6,414,798 B1 | * | 7/2002 | Koizumi .............. | G02B 25/001 359/643 |
| 6,804,066 B1 | * | 10/2004 | Ha ........................ | G02B 5/1814 359/683 |
| 6,900,948 B2 | * | 5/2005 | Sato ........................ | G02B 9/34 359/715 |
| 9,454,062 B2 | * | 9/2016 | Matsuo ................... | G02B 9/16 |
| 9,715,085 B2 | * | 7/2017 | Murayama ........... | G02B 13/004 |
| 2011/0122502 A1 | * | 5/2011 | Nishio ................. | G02B 25/001 359/645 |
| 2014/0218806 A1 | * | 8/2014 | Ishizuka ................ | G02B 13/22 359/644 |
| 2015/0103411 A1 | * | 4/2015 | Katagata .............. | G02B 25/001 359/644 |
| 2016/0011397 A1 | | 1/2016 | Chiang | |

(Continued)

FOREIGN PATENT DOCUMENTS

| | | |
|---|---|---|
| CN | 106094169 A | 11/2016 |
| CN | 106154494 A | 11/2016 |
| TW | 201608269 A | 3/2016 |

Primary Examiner — William R Alexander
(74) Attorney, Agent, or Firm — Winston Hsu

(57) ABSTRACT

An ocular optical system has four lens elements, wherein the ocular optical system includes a first lens element having a display-side surface with a convex portion in a vicinity of its periphery, and a third lens element having an eye-side surface with a convex portion in a vicinity of its periphery. In addition, υ1 is an Abbe number of the first lens element, υ4 is an Abbe number of the fourth lens element, and the ocular optical system satisfies the relationship $20.00 \leq |\upsilon 1 - \upsilon 4|$.

16 Claims, 31 Drawing Sheets

(56) References Cited

U.S. PATENT DOCUMENTS

2016/0139361 A1* 5/2016 Murayama ........... G02B 25/001
                                                     359/644
2018/0081151 A1* 3/2018 Bone ................. G02B 13/0035

* cited by examiner

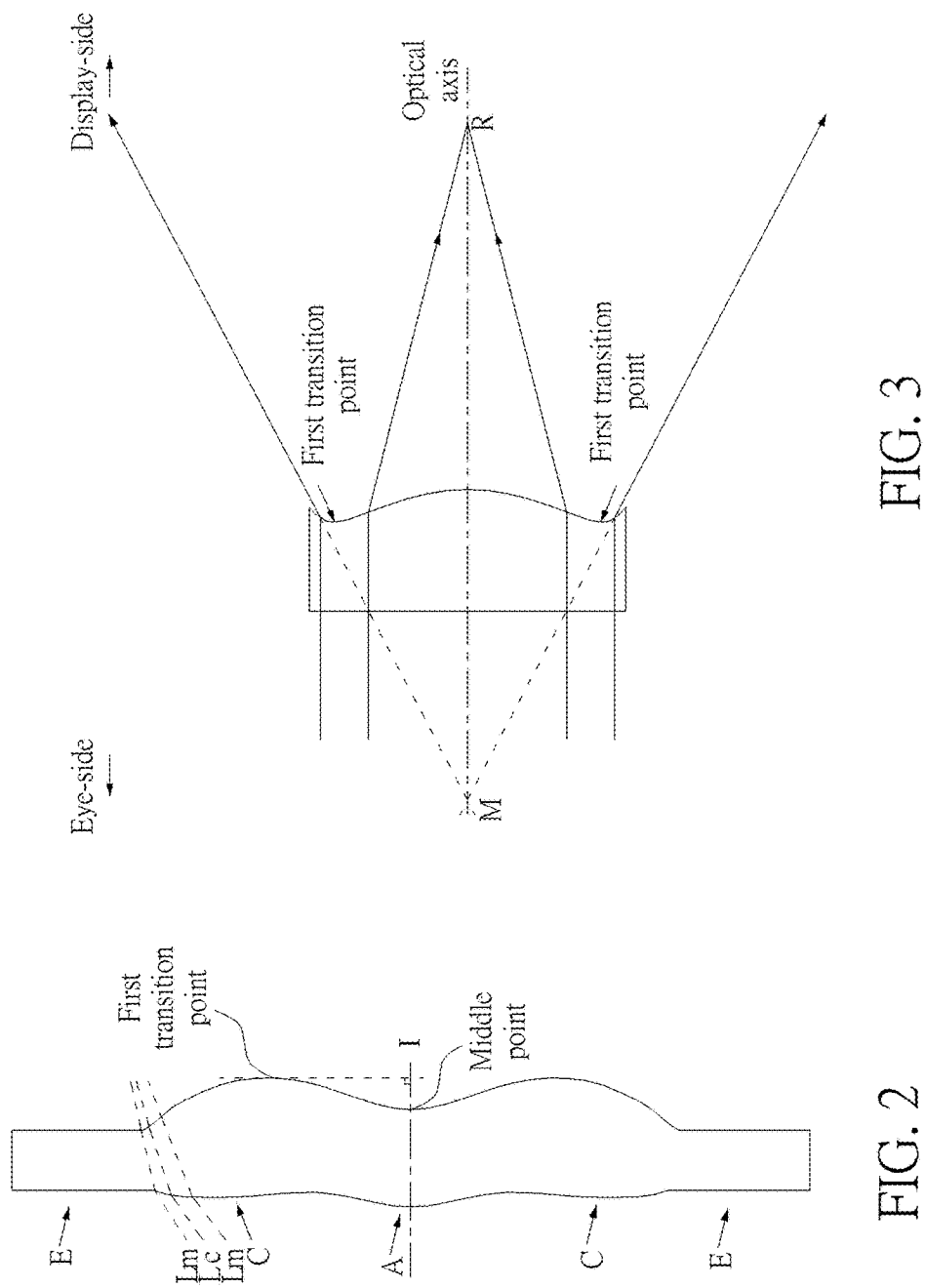

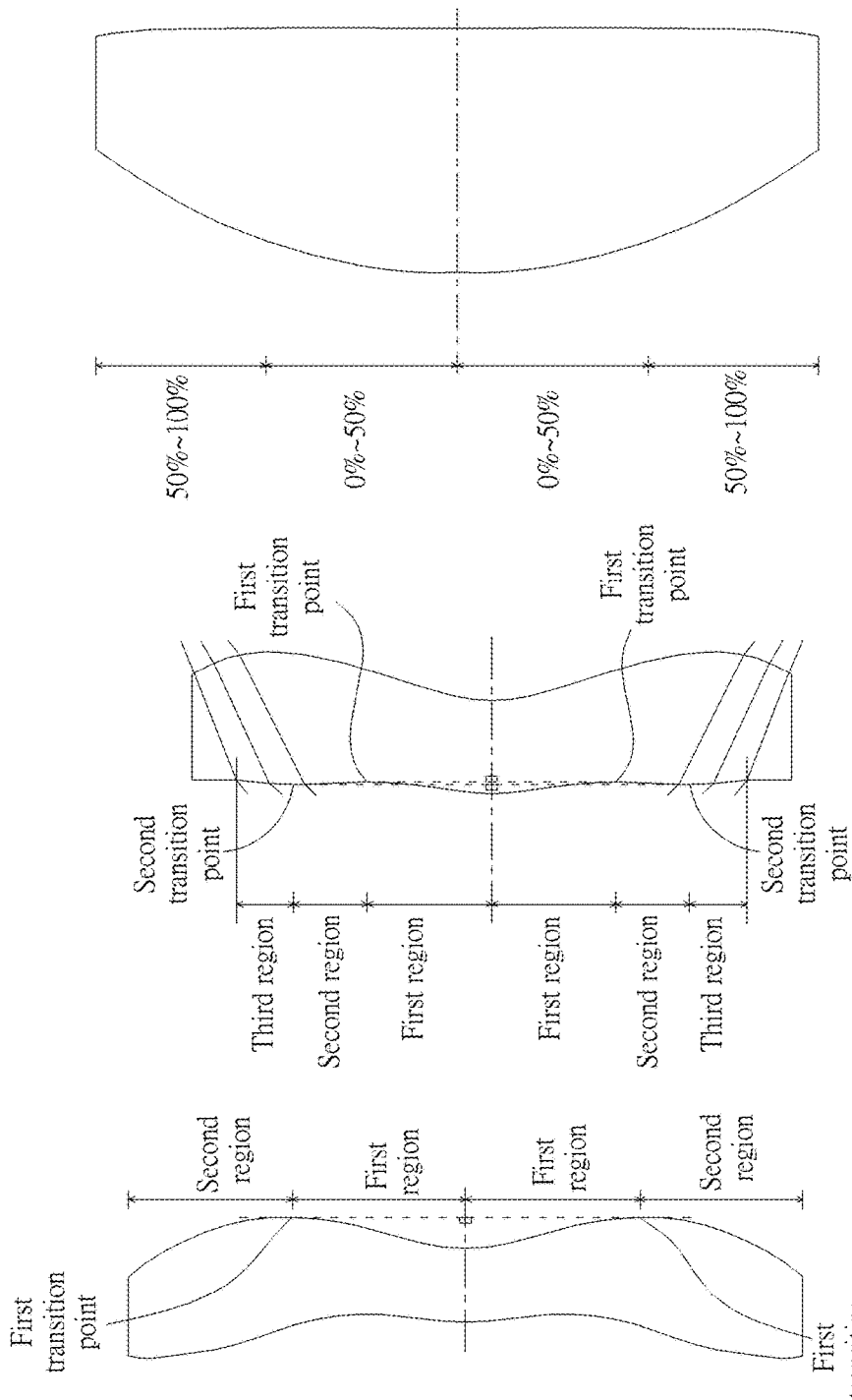

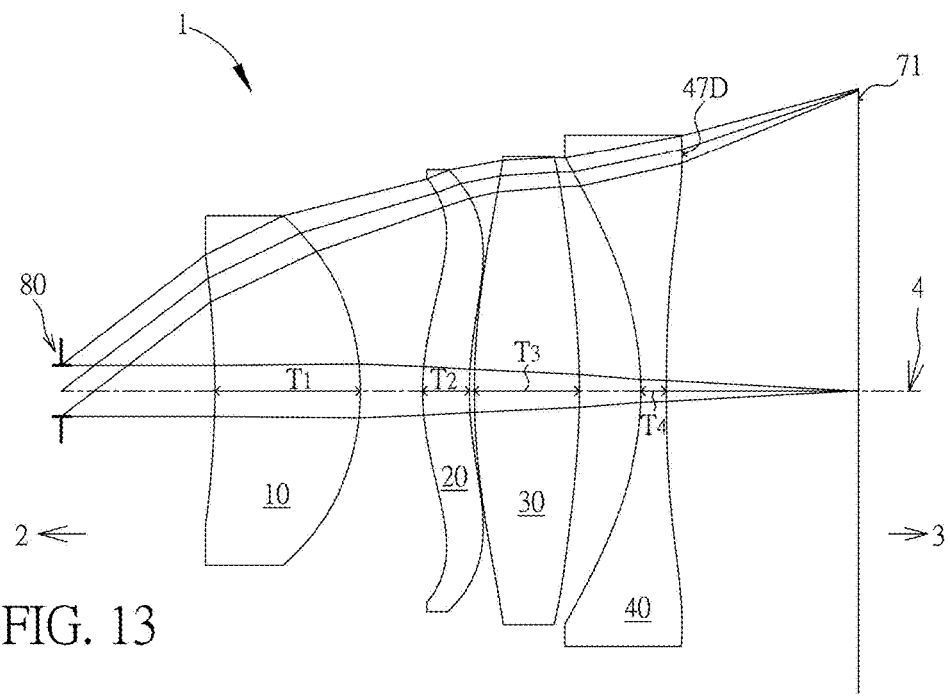
FIG. 13
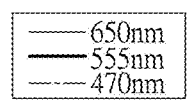
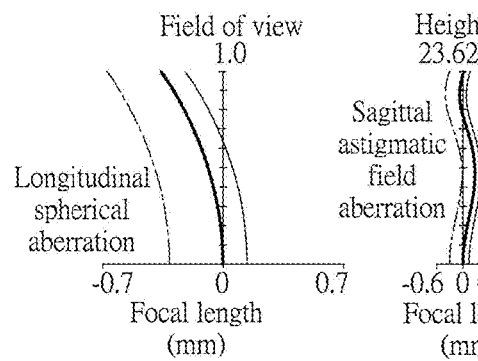
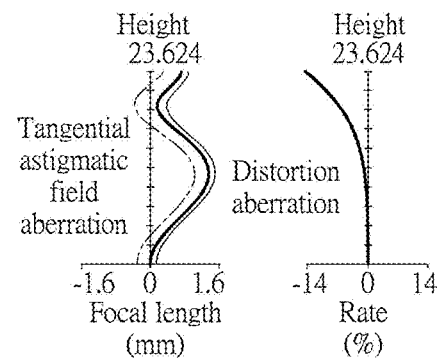
FIG. 14A   FIG. 14B   FIG. 14C   FIG. 14D

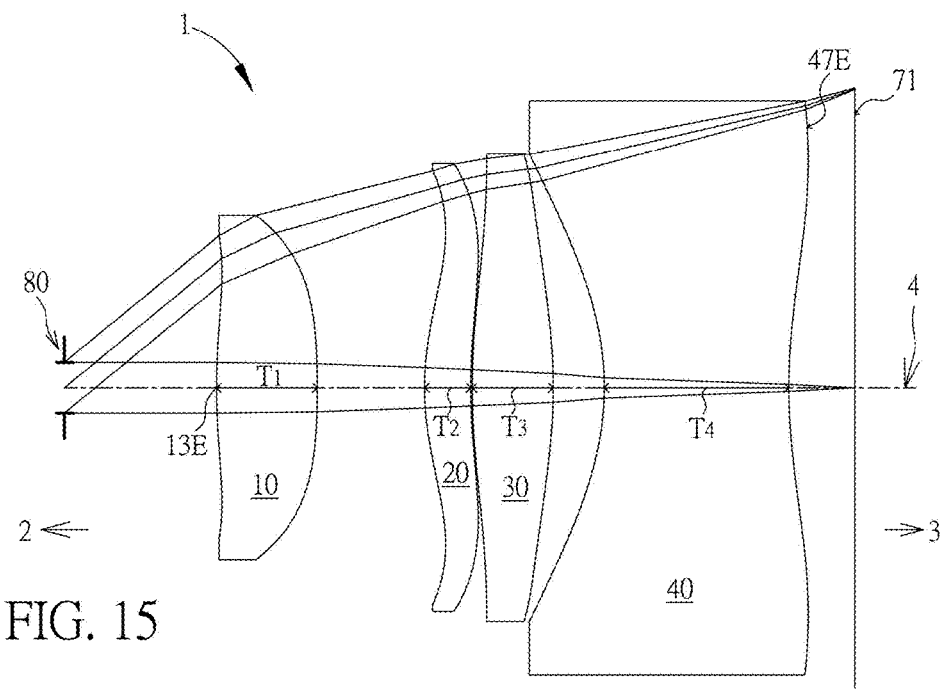
FIG. 15
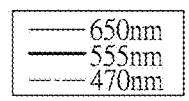
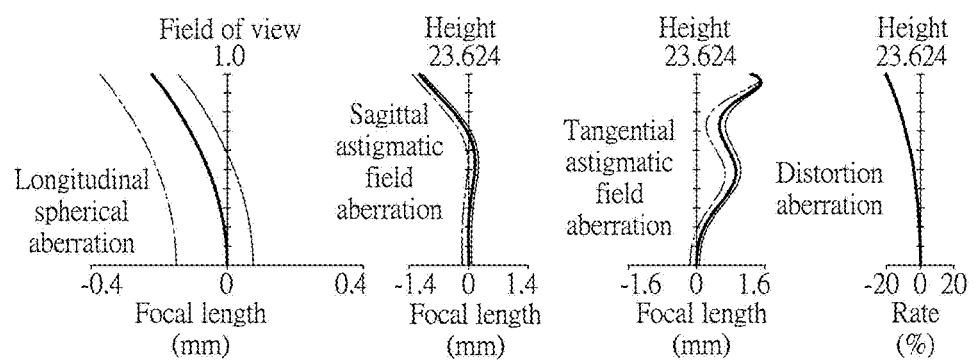
FIG. 16A    FIG. 16B    FIG. 16C    FIG. 16D

| First Example | | | | | | |
|---|---|---|---|---|---|---|
| EFL=33.992 mm, ω= 45.000Degree, TTL=42.653 mm, Fno=8.500 | | | | | | |
| No. | | Curvature Radius | Ape. Stop Lens Thickness Air Gap | | Refractive Index | Abbe No. | Focal Length |
| | Observer's Pupil | Infinity | 12.000 | | | | |
| 11 | First Lens | -210.344 | 6.980 | T1 | 1.548 | 42.204 | 56.821 |
| 12 | | -27.426 | 3.550 | G12 | | | |
| 21 | Second Lens | 20.575 | 3.127 | T2 | 1.535 | 55.690 | 88.775 |
| 22 | | 34.387 | 0.110 | G23 | | | |
| 31 | Third Lens | 36.967 | 6.234 | T3 | 1.535 | 55.690 | 50.278 |
| 32 | | -92.856 | 4.182 | G34 | | | |
| 41 | Fourth Lens | -23.266 | 3.764 | T4 | 1.661 | 20.401 | -30.978 |
| 42 | | 180.823 | 14.707 | G4D | | | |
| 71 | Display Screen | Infinity | | | | | |

FIG. 25

| No. | K | a2 | a4 | a6 | a8 |
|---|---|---|---|---|---|
| 11 | 0.000000E+00 | 0.000000E+00 | 6.297891E-06 | -4.287540E-08 | -1.379930E-10 |
| 12 | -9.034863E+00 | 0.000000E+00 | -8.029763E-05 | -3.148456E-08 | 3.421520E-10 |
| 21 | 0.000000E+00 | 0.000000E+00 | -8.394928E-05 | -3.781673E-08 | -3.631300E-11 |
| 22 | 0.000000E+00 | 0.000000E+00 | -6.474229E-05 | -2.921229E-08 | 6.532000E-11 |
| 31 | 0.000000E+00 | 0.000000E+00 | -1.331841E-06 | -2.474239E-08 | -4.470000E-13 |
| 32 | 0.000000E+00 | 0.000000E+00 | 1.331073E-05 | -8.329283E-09 | -2.157900E-11 |
| 41 | 0.000000E+00 | 0.000000E+00 | 2.464159E-05 | 3.273186E-08 | 3.946000E-11 |
| 42 | 0.000000E+00 | 0.000000E+00 | 2.348030E-05 | -9.212146E-08 | 1.828300E-10 |

| No. | a10 | a12 | a14 | a16 | a18 |
|---|---|---|---|---|---|
| 11 | 6.990000E-13 | 0.000000E+00 | 0.000000E+00 | 0.000000E+00 | 0.000000E+00 |
| 12 | -4.820000E-13 | 0.000000E+00 | 0.000000E+00 | 0.000000E+00 | 0.000000E+00 |
| 21 | 3.800000E-14 | 0.000000E+00 | 0.000000E+00 | 0.000000E+00 | 0.000000E+00 |
| 22 | 1.170000E-13 | 0.000000E+00 | 0.000000E+00 | 0.000000E+00 | 0.000000E+00 |
| 31 | 1.500000E-14 | 0.000000E+00 | 0.000000E+00 | 0.000000E+00 | 0.000000E+00 |
| 32 | 2.500000E-14 | 0.000000E+00 | 0.000000E+00 | 0.000000E+00 | 0.000000E+00 |
| 41 | -5.000000E-14 | 0.000000E+00 | 0.000000E+00 | 0.000000E+00 | 0.000000E+00 |
| 42 | -1.700000E-13 | 0.000000E+00 | 0.000000E+00 | 0.000000E+00 | 0.000000E+00 |

FIG. 26

| Second Example | | | | | | |
|---|---|---|---|---|---|---|
| EFL=34.518 mm, ω= 45.000Degree, TTL=41.131 mm, Fno=8.642 | | | | | | |
| No. | | Curvature Radius | Ape. Stop Lens Thickness Air Gap | | Refractive Index | Abbe No. | Focal Length |
| | Observer's Pupil | Infinity | 12.000 | | | | |
| 11 | First Lens | -87.535 | 7.077 | T1 | 1.487 | 84.474 | 56.076 |
| 12 | | -21.351 | 0.130 | G12 | | | |
| 21 | Second Lens | 19.805 | 2.981 | T2 | 1.535 | 55.690 | 137.809 |
| 22 | | 25.661 | 0.177 | G23 | | | |
| 31 | Third Lens | 35.145 | 9.219 | T3 | 1.535 | 55.690 | 69.356 |
| 32 | | 607.690 | 8.262 | G34 | | | |
| 41 | Fourth Lens | -23.060 | 1.893 | T4 | 1.661 | 20.401 | -34.253 |
| 42 | | 1244.829 | 11.390 | G4D | | | |
| 71 | Display Screen | Infinity | | | | | |

FIG. 27

| No. | K | a2 | a4 | a6 | a8 |
|---|---|---|---|---|---|
| 11 | 0.000000E+00 | 0.000000E+00 | 2.575814E-05 | 1.035638E-08 | -1.646670E-10 |
| 12 | -4.484952E+00 | 0.000000E+00 | -5.531545E-05 | -3.085143E-09 | 3.050850E-10 |
| 21 | 0.000000E+00 | 0.000000E+00 | -8.538210E-05 | -5.162262E-08 | -4.734400E-11 |
| 22 | 0.000000E+00 | 0.000000E+00 | -6.843244E-05 | -3.634562E-08 | 2.761200E-11 |
| 31 | 0.000000E+00 | 0.000000E+00 | 6.464404E-06 | -1.634827E-08 | 5.900000E-14 |
| 32 | 0.000000E+00 | 0.000000E+00 | 9.690995E-06 | -1.162225E-08 | -2.951600E-11 |
| 41 | 0.000000E+00 | 0.000000E+00 | 1.888594E-05 | 2.047167E-08 | 3.311000E-11 |
| 42 | 0.000000E+00 | 0.000000E+00 | 1.067190E-05 | -5.542422E-08 | 9.197000E-11 |

| No. | a10 | a12 | a14 | a16 | a18 |
|---|---|---|---|---|---|
| 11 | 1.240000E-13 | 0.000000E+00 | 0.000000E+00 | 0.000000E+00 | 0.000000E+00 |
| 12 | 9.700000E-14 | 0.000000E+00 | 0.000000E+00 | 0.000000E+00 | 0.000000E+00 |
| 21 | 3.600000E-14 | 0.000000E+00 | 0.000000E+00 | 0.000000E+00 | 0.000000E+00 |
| 22 | -1.100000E-14 | 0.000000E+00 | 0.000000E+00 | 0.000000E+00 | 0.000000E+00 |
| 31 | -1.400000E-14 | 0.000000E+00 | 0.000000E+00 | 0.000000E+00 | 0.000000E+00 |
| 32 | -2.000000E-15 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -2.000000E-14 | 0.000000E+00 | 0.000000E+00 | 0.000000E+00 | 0.000000E+00 |

FIG. 28

| Third Example | | | | | | |
|---|---|---|---|---|---|---|
| EFL=29.945 mm, ω= 45.000Degree, TTL=36.326 mm, Fno=7.531 | | | | | | |
| No. | | Curvature Radius | Ape. Stop Lens Thickness Air Gap | Refractive Index | Abbe No. | Focal Length |
| | Observer's Pupil | Infinity | 12.000 | | | |
| 11 | First Lens | -81.962 | 7.956 | T1 | 1.535 | 55.690 | 39.939 |
| 12 | | -17.518 | 0.130 | G12 | | | |
| 21 | Second Lens | 19.254 | 2.632 | T2 | 1.535 | 55.690 | 120.882 |
| 22 | | 26.114 | 0.110 | G23 | | | |
| 31 | Third Lens | 30.198 | 4.598 | T3 | 1.535 | 55.690 | 66.674 |
| 32 | | 186.701 | 6.966 | G34 | | | |
| 41 | Fourth Lens | -22.643 | 1.949 | T4 | 1.661 | 20.401 | -28.145 |
| 42 | | 107.499 | 11.984 | G4D | | | |
| 71 | Display Screen | Infinity | | | | |

FIG. 29

| No. | K | a2 | a4 | a6 | a8 |
|---|---|---|---|---|---|
| 11 | 0.000000E+00 | 0.000000E+00 | 1.945492E-05 | 2.033309E-08 | -1.244460E-10 |
| 12 | -4.265693E+00 | 0.000000E+00 | -7.216104E-05 | -4.257070E-08 | 3.569320E-10 |
| 21 | 0.000000E+00 | 0.000000E+00 | -7.407798E-05 | -4.270010E-08 | -5.483200E-11 |
| 22 | 0.000000E+00 | 0.000000E+00 | -6.668050E-05 | -1.559764E-08 | 1.133640E-10 |
| 31 | 0.000000E+00 | 0.000000E+00 | 2.589717E-06 | -2.577078E-08 | -1.699900E-11 |
| 32 | 0.000000E+00 | 0.000000E+00 | 1.245182E-05 | -5.023541E-09 | -1.825700E-11 |
| 41 | 0.000000E+00 | 0.000000E+00 | 2.376784E-05 | 2.764770E-08 | 4.777000E-11 |
| 42 | 0.000000E+00 | 0.000000E+00 | 5.692603E-06 | -5.777050E-08 | 8.332000E-11 |

| No. | a10 | a12 | a14 | a16 | a18 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 30

| | Fourth Example | | | | | |
|---|---|---|---|---|---|---|
| | EFL=36.006 mm, ω= 45.000Degree, TTL=50.400 mm, Fno=8.936 | | | | | |
| No. | | Curvature Radius | Ape. Stop Lens Thickness Air Gap | | Refractive Index | Abbe No. | Focal Length |
| | Observer's Pupil | Infinity | 12.000 | | | | |
| 11 | First Lens | -70.723 | 11.426 | T1 | 1.535 | 55.690 | 50.526 |
| 12 | | -20.653 | 4.870 | G12 | | | |
| 21 | Second Lens | 20.840 | 3.652 | T2 | 1.535 | 55.690 | 133.690 |
| 22 | | 27.616 | 0.385 | G23 | | | |
| 31 | Third Lens | 57.141 | 8.205 | T3 | 1.535 | 55.690 | 57.875 |
| 32 | | -64.160 | 4.854 | G34 | | | |
| 41 | Fourth Lens | -25.182 | 2.001 | T4 | 1.661 | 20.401 | -33.169 |
| 42 | | 174.032 | 15.006 | G4D | | | |
| 71 | Display Screen | Infinity | | | | | |

FIG. 31

| No. | K | a2 | a4 | a6 | a8 |
|---|---|---|---|---|---|
| 11 | 0.000000E+00 | 0.000000E+00 | 7.950882E-06 | -1.207765E-08 | -9.040200E-11 |
| 12 | -3.183627E+00 | 0.000000E+00 | -6.736010E-05 | -2.802648E-08 | 2.164470E-10 |
| 21 | 0.000000E+00 | 0.000000E+00 | -8.422440E-05 | -5.007378E-08 | -7.931700E-11 |
| 22 | 0.000000E+00 | 0.000000E+00 | -7.844167E-05 | -4.363648E-08 | 5.700800E-11 |
| 31 | 0.000000E+00 | 0.000000E+00 | -2.592783E-06 | -2.092220E-08 | 2.653000E-11 |
| 32 | 0.000000E+00 | 0.000000E+00 | 1.171656E-05 | -6.879464E-09 | -2.758000E-11 |
| 41 | 0.000000E+00 | 0.000000E+00 | 1.260763E-05 | 6.255300E-09 | 2.012000E-11 |
| 42 | 0.000000E+00 | 0.000000E+00 | 2.233716E-05 | -8.120562E-08 | 6.368000E-11 |

| No. | a10 | a12 | a14 | a16 | a18 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 32

| Fifth Example |||||||
|---|---|---|---|---|---|---|
| EFL=36.006 mm, ω=45.000Degree, TTL=50.399 mm, Fno=8.936 |||||||
| No. | | Curvature Radius | Ape. Stop Lens Thickness Air Gap | | Refractive Index | Abbe No. | Focal Length |
| | Observer's Pupil | Infinity | 12.000 | | | | |
| 11 | First Lens | 52.354 | 7.932 | T1 | 1.535 | 55.690 | 60.020 |
| 12 | | -78.601 | 8.506 | G12 | | | |
| 21 | Second Lens | 22.468 | 3.652 | T2 | 1.535 | 55.690 | 75.737 |
| 22 | | 47.595 | 0.110 | G23 | | | |
| 31 | Third Lens | 56.417 | 6.380 | T3 | 1.535 | 55.690 | 47.256 |
| 32 | | -43.981 | 4.021 | G34 | | | |
| 41 | Fourth Lens | -23.006 | 14.605 | T4 | 1.661 | 20.401 | -21.432 |
| 42 | | 46.109 | 5.192 | G4D | | | |
| 71 | Display Screen | Infinity | | | | | |

FIG. 33

| No. | K | a2 | a4 | a6 | a8 |
|---|---|---|---|---|---|
| 11 | 0.000000E+00 | 0.000000E+00 | -4.575347E-05 | -1.346438E-07 | 3.354410E-10 |
| 12 | 1.662199E+01 | 0.000000E+00 | -1.131495E-04 | 2.083325E-07 | -7.484700E-10 |
| 21 | 0.000000E+00 | 0.000000E+00 | -8.879017E-05 | 2.208236E-09 | 4.244700E-11 |
| 22 | 0.000000E+00 | 0.000000E+00 | -4.650761E-05 | -2.994471E-08 | 7.834200E-11 |
| 31 | 0.000000E+00 | 0.000000E+00 | -1.912512E-05 | -9.893013E-09 | 4.877000E-11 |
| 32 | 0.000000E+00 | 0.000000E+00 | 2.633294E-05 | -1.277946E-08 | -5.864500E-11 |
| 41 | 0.000000E+00 | 0.000000E+00 | 2.078403E-05 | 2.253931E-08 | 6.150000E-12 |
| 42 | 0.000000E+00 | 0.000000E+00 | -2.378875E-05 | 9.205310E-09 | 4.910000E-12 |

| No. | a10 | a12 | a14 | a16 | a18 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 34

| Sixth Example ||||||
|---|---|---|---|---|---|
| EFL=35.032 mm, ω=45.000Degree, TTL=41.223mm, Fno=8.761 ||||||
| No. | | Curvature Radius | Ape. Stop Lens Thickness Air Gap | Refractive Index | Abbe No. | Focal Length |
| | Observer's Pupil | Infinity | 12.000 | | | |
| 11 | First Lens | -45.978 | 6.737 T1 | 1.535 | 55.690 | 49.141 |
| 12 | | -17.577 | 0.238 G12 | | | |
| 21 | Second Lens | 19.834 | 2.987 T2 | 1.535 | 55.690 | 135.800 |
| 22 | | 25.852 | 0.200 G23 | | | |
| 31 | Third Lens | 36.365 | 5.609 T3 | 1.535 | 55.690 | 71.329 |
| 32 | | 735.509 | 6.516 G34 | | | |
| 41 | Fourth Lens | -23.926 | 2.228 T4 | 1.661 | 20.401 | -37.826 |
| 42 | | -583.936 | 16.708 G4D | | | |
| 71 | Display Screen | Infinity | | | | |

FIG. 35

| No. | K | a2 | a4 | a6 | a8 |
|---|---|---|---|---|---|
| 11 | 0.000000E+00 | 0.000000E+00 | 2.079147E-05 | -5.996277E-09 | -1.607800E-10 |
| 12 | -3.458900E+00 | 0.000000E+00 | -7.720869E-05 | -3.162767E-08 | 3.783940E-10 |
| 21 | 0.000000E+00 | 0.000000E+00 | -8.080210E-05 | -3.431354E-08 | -3.390200E-11 |
| 22 | 0.000000E+00 | 0.000000E+00 | -6.820096E-05 | -3.515313E-08 | 6.615800E-11 |
| 31 | 0.000000E+00 | 0.000000E+00 | 1.627316E-06 | -2.471876E-08 | 1.051400E-11 |
| 32 | 0.000000E+00 | 0.000000E+00 | 1.211226E-05 | -1.193279E-08 | -5.486200E-11 |
| 41 | 0.000000E+00 | 0.000000E+00 | 2.856981E-05 | -1.850300E-09 | -1.179000E-11 |
| 42 | 0.000000E+00 | 0.000000E+00 | 1.914861E-05 | -6.588223E-08 | 5.049000E-11 |

| No. | a10 | a12 | a14 | a16 | a18 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 36

| Seventh Example ||||||| 
|---|---|---|---|---|---|---|
| EFL=33.880 mm, ω= 45.000Degree, TTL=41.988mm, Fno=8.436 |||||||
| No. | | Curvature Radius | Ape. Stop Lens Thickness Air Gap | | Refractive Index | Abbe No. | Focal Length |
| | Observer's Pupil | Infinity | 12.000 | | | | |
| 11 | First Lens | -154.229 | 6.954 | T1 | 1.535 | 55.690 | 50.086 |
| 12 | | -23.182 | 5.427 | G12 | | | |
| 21 | Second Lens | 20.013 | 3.043 | T2 | 1.535 | 55.690 | 126.390 |
| 22 | | 26.925 | 0.148 | G23 | | | |
| 31 | Third Lens | 35.498 | 6.351 | T3 | 1.535 | 55.690 | 60.463 |
| 32 | | -340.565 | 6.577 | G34 | | | |
| 41 | Fourth Lens | -24.067 | 1.846 | T4 | 1.661 | 20.401 | -31.757 |
| 42 | | 168.433 | 11.643 | G4D | | | |
| 71 | Display Screen | Infinity | | | | | |

FIG. 37

| No. | K | a2 | a4 | a6 | a8 |
|---|---|---|---|---|---|
| 11 | 0.000000E+00 | 0.000000E+00 | 2.103549E-05 | 7.912072E-09 | -1.289860E-10 |
| 12 | -5.216193E+00 | 0.000000E+00 | -5.606834E-05 | 1.280345E-09 | 3.422310E-10 |
| 21 | 0.000000E+00 | 0.000000E+00 | -8.329206E-05 | -5.110819E-08 | -6.512500E-11 |
| 22 | 0.000000E+00 | 0.000000E+00 | -7.173945E-05 | -3.921644E-08 | 3.993100E-11 |
| 31 | 0.000000E+00 | 0.000000E+00 | 5.619416E-06 | -1.864504E-08 | -7.793000E-12 |
| 32 | 0.000000E+00 | 0.000000E+00 | 1.018278E-05 | -7.412779E-09 | -1.750500E-11 |
| 41 | 0.000000E+00 | 0.000000E+00 | 2.469208E-05 | 1.692000E-08 | 2.467000E-11 |
| 42 | 0.000000E+00 | 0.000000E+00 | 2.960815E-05 | -1.082294E-07 | 1.770200E-10 |

| No. | a10 | a12 | a14 | a16 | a18 |
|---|---|---|---|---|---|
| 11 | 1.760000E-13 | 0.000000E+00 | 0.000000E+00 | 0.000000E+00 | 0.000000E+00 |
| 12 | 1.940000E-13 | 0.000000E+00 | 0.000000E+00 | 0.000000E+00 | 0.000000E+00 |
| 21 | -2.300000E-14 | 0.000000E+00 | 0.000000E+00 | 0.000000E+00 | 0.000000E+00 |
| 22 | 4.500000E-14 | 0.000000E+00 | 0.000000E+00 | 0.000000E+00 | 0.000000E+00 |
| 31 | -2.200000E-14 | 0.000000E+00 | 0.000000E+00 | 0.000000E+00 | 0.000000E+00 |
| 32 | 2.000000E-14 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | -1.400000E-13 | 0.000000E+00 | 0.000000E+00 | 0.000000E+00 | 0.000000E+00 |

FIG. 38

| Eighth Example ||||||
|---|---|---|---|---|---|
| EFL=36.035 mm, ω=45.000Degree, TTL=37.672 mm, Fno=9.179 ||||||
| No. | Curvature Radius | Ape. Stop Lens Thickness Air Gap | | Refractive Index | Abbe No. | Focal Length |
| | Observer's Pupil | Infinity | 12.000 | | | |
| 11 | First Lens | -435.937 | 6.416 | T1 | 1.535 | 55.690 | 49.659 |
| 12 | | -25.163 | 0.130 | G12 | | | |
| 21 | Second Lens | 19.536 | 3.467 | T2 | 1.535 | 55.690 | 111.380 |
| 22 | | 27.273 | 0.110 | G23 | | | |
| 31 | Third Lens | 28.003 | 4.897 | T3 | 1.535 | 55.690 | 67.823 |
| 32 | | 115.327 | 6.559 | G34 | | | |
| 41 | Fourth Lens | -22.931 | 2.011 | T4 | 1.661 | 20.401 | -28.082 |
| 42 | | 100.503 | 15.082 | G4D | | | |
| 71 | Display Screen | Infinity | | | | | |

FIG. 39

| No. | K | a2 | a4 | a6 | a8 |
|---|---|---|---|---|---|
| 11 | 0.000000E+00 | 0.000000E+00 | 1.660736E-05 | 2.415720E-08 | -6.623300E-11 |
| 12 | -9.203234E+00 | 0.000000E+00 | -4.194980E-05 | 1.198821E-08 | 2.581640E-10 |
| 21 | 0.000000E+00 | 0.000000E+00 | -8.121548E-05 | -5.368364E-08 | -4.486000E-11 |
| 22 | 0.000000E+00 | 0.000000E+00 | -7.384403E-05 | -2.876109E-08 | 5.398900E-11 |
| 31 | 0.000000E+00 | 0.000000E+00 | 3.150190E-06 | -2.755123E-08 | -1.810200E-11 |
| 32 | 0.000000E+00 | 0.000000E+00 | 8.967614E-06 | -6.743700E-09 | -1.955400E-11 |
| 41 | 0.000000E+00 | 0.000000E+00 | 2.699337E-05 | 2.958016E-08 | 4.951000E-11 |
| 42 | 0.000000E+00 | 0.000000E+00 | 5.990231E-06 | -5.071905E-08 | 1.066600E-10 |

| No. | a10 | a12 | a14 | a16 | a18 |
|---|---|---|---|---|---|
| 11 | -1.890000E-13 | 0.000000E+00 | 0.000000E+00 | 0.000000E+00 | 0.000000E+00 |
| 12 | -6.000000E-15 | 0.000000E+00 | 0.000000E+00 | 0.000000E+00 | 0.000000E+00 |
| 21 | 3.300000E-14 | 0.000000E+00 | 0.000000E+00 | 0.000000E+00 | 0.000000E+00 |
| 22 | 7.300000E-14 | 0.000000E+00 | 0.000000E+00 | 0.000000E+00 | 0.000000E+00 |
| 31 | -3.800000E-14 | 0.000000E+00 | 0.000000E+00 | 0.000000E+00 | 0.000000E+00 |
| 32 | 1.300000E-14 | 0.000000E+00 | 0.000000E+00 | 0.000000E+00 | 0.000000E+00 |
| 41 | 4.000000E-14 | 0.000000E+00 | 0.000000E+00 | 0.000000E+00 | 0.000000E+00 |
| 42 | 1.000000E-14 | 0.000000E+00 | 0.000000E+00 | 0.000000E+00 | 0.000000E+00 |

FIG. 40

| Ninth Example ||||||
|---|---|---|---|---|---|
| EFL=33.882 mm, ω= 45.000Degree, TTL=42.668 mm, Fno=8.486 ||||||
| No. | | Curvature Radius | Ape. Stop Lens Thickness Air Gap | Refractive Index | Abbe No. | Focal Length |
| | Observer's Pupil | Infinity | 12.000 | | | |
| 11 | First Lens | 1211.141 | 6.934 | T1 | 1.535 | 55.690 | 55.232 |
| 12 | | -30.218 | 4.092 | G12 | | | |
| 21 | Second Lens | 20.441 | 9.362 | T2 | 1.535 | 55.690 | 86.556 |
| 22 | | 30.760 | 0.244 | G23 | | | |
| 31 | Third Lens | 56.443 | 5.472 | T3 | 1.535 | 55.690 | 58.814 |
| 32 | | -68.654 | 5.030 | G34 | | | |
| 41 | Fourth Lens | -23.252 | 1.950 | T4 | 1.661 | 20.401 | -26.824 |
| 42 | | 76.956 | 9.584 | G4D | | | |
| 71 | Display Screen | Infinity | | | | |

FIG. 41

| No. | K | a2 | a4 | a6 | a8 |
|---|---|---|---|---|---|
| 11 | 0.000000E+00 | 0.000000E+00 | 1.945003E-05 | 1.683853E-08 | -7.558000E-12 |
| 12 | -8.862446E+00 | 0.000000E+00 | -4.631359E-05 | 2.537004E-08 | 3.668650E-10 |
| 21 | 0.000000E+00 | 0.000000E+00 | -7.064257E-05 | -4.638483E-08 | -6.291900E-11 |
| 22 | 0.000000E+00 | 0.000000E+00 | -8.758836E-05 | -2.351288E-08 | 9.233400E-11 |
| 31 | 0.000000E+00 | 0.000000E+00 | -3.444232E-07 | -2.188818E-08 | 2.288100E-11 |
| 32 | 0.000000E+00 | 0.000000E+00 | 1.409080E-05 | -1.060434E-09 | -2.400700E-11 |
| 41 | 0.000000E+00 | 0.000000E+00 | 1.856218E-05 | 1.649301E-08 | 4.315000E-11 |
| 42 | 0.000000E+00 | 0.000000E+00 | 8.657038E-06 | -2.873998E-08 | 2.662000E-11 |

| No. | a10 | a12 | a14 | a16 | a18 |
|---|---|---|---|---|---|
| 11 | 0.000000E+00 | 0.000000E+00 | 0.000000E+00 | 0.000000E+00 | 0.000000E+00 |
| 12 | 0.000000E+00 | 0.000000E+00 | 0.000000E+00 | 0.000000E+00 | 0.000000E+00 |
| 21 | 0.000000E+00 | 0.000000E+00 | 0.000000E+00 | 0.000000E+00 | 0.000000E+00 |
| 22 | 0.000000E+00 | 0.000000E+00 | 0.000000E+00 | 0.000000E+00 | 0.000000E+00 |
| 31 | 0.000000E+00 | 0.000000E+00 | 0.000000E+00 | 0.000000E+00 | 0.000000E+00 |
| 32 | 0.000000E+00 | 0.000000E+00 | 0.000000E+00 | 0.000000E+00 | 0.000000E+00 |
| 41 | 0.000000E+00 | 0.000000E+00 | 0.000000E+00 | 0.000000E+00 | 0.000000E+00 |
| 42 | 0.000000E+00 | 0.000000E+00 | 0.000000E+00 | 0.000000E+00 | 0.000000E+00 |

FIG. 42

| Example | First | Second | Third | Fourth | Fifth | Sixth | Seventh | Eighth | Ninth |
|---|---|---|---|---|---|---|---|---|---|
| EFL | 33.992 | 34.518 | 29.945 | 36.006 | 36.006 | 35.032 | 33.880 | 36.035 | 33.882 |
| ER | 12.000 | 12.000 | 12.000 | 12.000 | 12.000 | 12.000 | 12.000 | 12.000 | 12.000 |
| ALT | 20.104 | 21.171 | 17.135 | 25.284 | 32.569 | 17.561 | 18.193 | 16.791 | 23.718 |
| G4D | 14.707 | 11.390 | 11.984 | 15.006 | 5.192 | 16.708 | 11.643 | 15.082 | 9.584 |
| TTL | 42.653 | 41.131 | 36.326 | 50.400 | 50.399 | 41.223 | 41.988 | 38.672 | 42.668 |
| SL | 54.653 | 53.131 | 48.326 | 62.400 | 62.399 | 53.223 | 53.988 | 50.672 | 54.668 |
| $|v1-v4|$ | 21.802 | 64.073 | 35.289 | 35.289 | 35.289 | 35.289 | 35.289 | 35.289 | 35.289 |
| SL / ER | 4.554 | 4.428 | 4.027 | 5.200 | 5.200 | 4.435 | 4.499 | 4.223 | 4.556 |
| TTL / ER | 3.554 | 3.428 | 3.027 | 4.200 | 4.200 | 3.435 | 3.499 | 3.223 | 3.556 |
| ER / T4 | 3.188 | 6.338 | 6.157 | 5.998 | 0.822 | 5.387 | 6.500 | 5.967 | 6.154 |
| G4D / T2 | 4.704 | 3.820 | 4.553 | 4.109 | 1.422 | 5.593 | 3.827 | 4.350 | 1.024 |
| ALT / (G12+G34) | 2.600 | 2.523 | 2.415 | 2.600 | 2.600 | 2.600 | 1.516 | 2.510 | 2.600 |
| EFL / T1 | 4.870 | 4.877 | 3.764 | 3.151 | 4.539 | 5.200 | 4.872 | 5.616 | 4.886 |
| TTL / T1 | 6.111 | 5.812 | 4.566 | 4.411 | 6.354 | 6.119 | 6.038 | 6.027 | 6.153 |
| TTL / T2 | 13.642 | 13.796 | 13.800 | 13.800 | 13.800 | 13.800 | 13.800 | 11.154 | 4.558 |
| G4D / T4 | 3.907 | 6.016 | 6.149 | 7.500 | 0.356 | 7.500 | 6.307 | 7.500 | 4.915 |
| SL / T2 | 17.480 | 17.821 | 18.359 | 17.086 | 17.086 | 17.817 | 17.744 | 14.615 | 5.839 |
| ER / (G12+G34) | 1.552 | 1.430 | 1.691 | 1.234 | 0.958 | 1.777 | 1.000 | 1.794 | 1.315 |
| SL / T1 | 7.830 | 7.507 | 6.074 | 5.461 | 7.866 | 7.900 | 7.763 | 7.897 | 7.884 |
| TTL / T3 | 6.842 | 4.461 | 7.900 | 6.143 | 7.900 | 7.350 | 6.612 | 7.898 | 7.798 |
| ALT / G34 | 4.808 | 2.563 | 2.460 | 5.209 | 8.099 | 2.695 | 2.766 | 2.560 | 4.715 |

FIG. 43

OCULAR OPTICAL SYSTEM

BACKGROUND OF THE INVENTION

1. Field of the Invention

The present invention generally relates to an ocular optical system. Specifically speaking, the present invention is directed to an ocular optical system for use in a virtual reality (VR) electronic device.

2. Description of the Prior Art

Virtual reality (VR) is a virtual world that uses computer technology to simulate a three-dimensional space. It provides users visual or auditory sensory emulation, and makes user feels immersive. In recent years, the existing VR devices are based on visual experience. The parallax of the human eye is simulated by a split screen corresponding to a slight difference in two view angles of the left and right eyes, to achieve the stereoscopic vision. In order to reduce the size of the virtual reality device and to allow the user having a magnified visual experience with a smaller display screen, the ocular optical system with magnification has become one of the VR research and development of the subject.

The existing ocular optical system has small half viewing angle, so that the user feels narrow vision and low resolution. In addition, since the chromatic aberration and distortion of the conventional ocular optical system are large, and the aberration is large enough to compensate the aberration of the display screen, it is a problem to improve the ocular optical system.

The purpose of the present invention is to provide an ocular optical system having shorter total length, but still maintains in a good optical image quality and having larger visual angle.

SUMMARY OF THE INVENTION

In light of the above, the present invention proposes an ocular optical system of four lens elements that having larger viewing angle and good optical performance. In one embodiment of the present invention, the ocular optical system of four lens elements of the present invention from an eye side toward a display side in order along an optical axis has a first lens element, a second lens element, a third lens element and a fourth lens element. Each lens element has an eye-side surface facing toward an eye side as well as a display-side surface facing toward a display side. The ocular optical system exclusively has the first lens element, the second lens element, the third lens element and the fourth lens element with refractive power.

The first lens element has a display-side surface with a convex portion in a vicinity of its periphery. The third lens element has an eye-side surface with a convex portion in a vicinity of its periphery. Besides, in another embodiment of the present invention, the third lens element has positive refractive power.

$\upsilon 1$ is an Abbe number of the first lens element, $\upsilon 4$ is an Abbe number of the fourth lens element, and the ocular optical system satisfies the relationship $20.00 \leq |\upsilon 1 - \upsilon 4|$.

In the ocular optical system of four lens elements of the present invention, SL is a distance between the pupil of the observer to the display screen, ER is a distance between the pupil of the observer to an eye-side surface of said first lens element, and the ocular optical system satisfies the relationship $SL/ER \leq 5.20$.

In the ocular optical system of four lens elements of the present invention, TTL is a distance between an eye-side surface of said first lens element to the display screen, and the ocular optical system satisfies the relationship $TTL/ER \leq 4.60$.

In the ocular optical system of four lens elements of the present invention, T4 is a thickness of the fourth lens element along the optical axis, and the ocular optical system satisfies the relationship $ER/T4 \leq 6.50$.

In the ocular optical system of four lens elements of the present invention, G4D is a distance between to a display-side surface of said fourth lens element to the display screen along the optical axis, T2 is a thickness of the second lens element along the optical axis, and the ocular optical system satisfies the relationship $G4D/T2 \leq 5.60$.

In the ocular optical system of four lens elements of the present invention, ALT is a total thickness of all four lens elements, G12 is an air gap between said first lens element and said second lens element along said optical axis, G34 is an air gap between said third lens element and said fourth lens element along said optical axis, and the ocular optical system satisfies the relationship $ALT/(G12+G34) \leq 2.60$.

In the ocular optical system of four lens elements of the present invention, EFL is an effective focal length of the ocular optical system, T1 is a thickness of the first lens element along the optical axis, and the ocular optical system satisfies the relationship $EFL/T1 \leq 5.70$.

In the ocular optical system of four lens elements of the present invention, TTL is a distance between an eye-side surface of said first lens element to the display screen, and the ocular optical system satisfies the relationship $TTL/T1 \leq 6.90$.

In the ocular optical system of four lens elements of the present invention, the ocular optical system further satisfies the relationship $TTL/T2 \leq 13.80$.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 2-6 illustrates the methods for determining the surface shapes and for determining one region is a region in a vicinity of the optical axis or the region in a vicinity of its circular periphery of one lens element.

FIG. 13 illustrates a fourth example of the ocular optical system of four lens elements of the present invention.

FIG. 14A illustrates the longitudinal spherical aberration of the fourth example.

FIG. 14B illustrates the astigmatic aberration on the sagittal direction of the fourth example.

FIG. 14C illustrates the astigmatic aberration on the tangential direction of the fourth example.

FIG. 14D illustrates the distortion aberration of the fourth example.

FIG. 15 illustrates a fifth example of the ocular optical system of four lens elements of the present invention.

FIG. 16A illustrates the longitudinal spherical aberration plane of the fifth example.

FIG. 16B illustrates the astigmatic aberration on the sagittal direction of the fifth example.

FIG. 16C illustrates the astigmatic aberration on the tangential direction of the fifth example.

FIG. 16D illustrates the distortion aberration of the fifth example.

FIG. 25 shows the optical data of the first example of the ocular optical system.

FIG. 26 shows the aspheric surface data of the first example.

FIG. 27 shows the optical data of the second example of the ocular optical system.

FIG. 28 shows the aspheric surface data of the second example.

FIG. 29 shows the optical data of the third example of the ocular optical system.

FIG. 30 shows the aspheric surface data of the third example.

FIG. 31 shows the optical data of the fourth example of the ocular optical system.

FIG. 32 shows the aspheric surface data of the fourth example.

FIG. 33 shows the optical data of the fifth example of the ocular optical system.

FIG. 34 shows the aspheric surface data of the fifth example.

FIG. 35 shows the optical data of the sixth example of the ocular optical system.

FIG. 36 shows the aspheric surface data of the sixth example.

FIG. 37 shows the optical data of the seventh example of the ocular optical system.

FIG. 38 shows the aspheric surface data of the seventh example.

FIG. 39 shows the optical data of the eighth example of the ocular optical system.

FIG. 40 shows the aspheric surface data of the eighth example.

FIG. 41 shows the optical data of the ninth example of the ocular optical system.

FIG. 42 shows the aspheric surface data of the ninth example.

FIG. 43 shows some important ratios in the examples.

DETAILED DESCRIPTION

Before the detailed description of the present invention, the first thing to be noticed is that in the present invention, similar (not necessarily identical) elements are labeled as the same numeral references.

Figure 1:
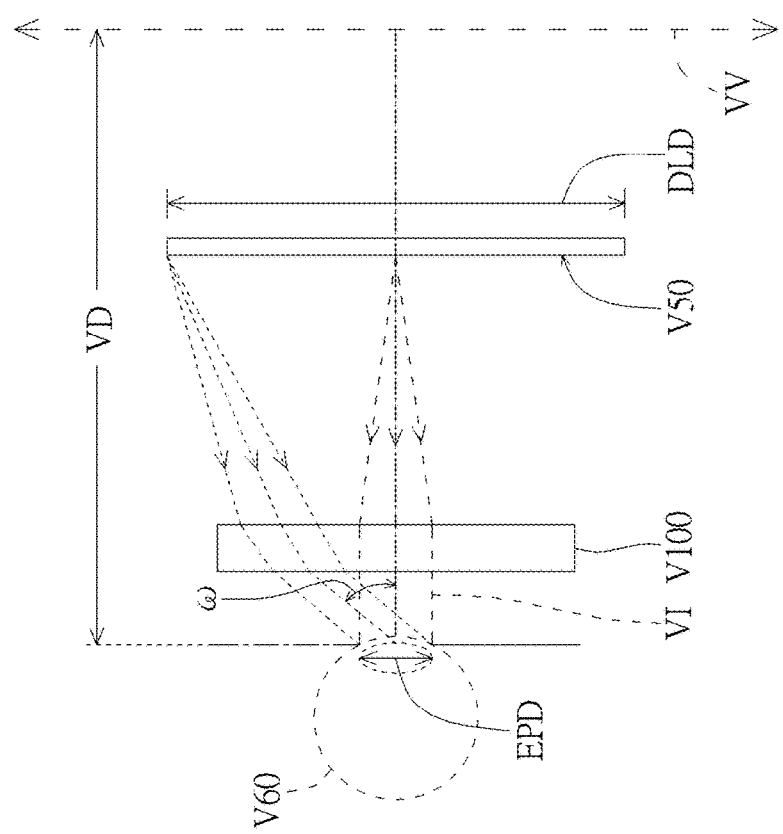
FIG. 1 illustrates a schematic representation of imaging rays emitted by a display screen and entering an eye via an ocular optical system, and then focusing on a retina of the eye.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a least distance of distinct vision VD, as depicted in FIG. 1. The following criteria for determining optical specifications of the present application are based on assumption that a reversely tracking of the ray direction is parallel imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e. the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e. the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
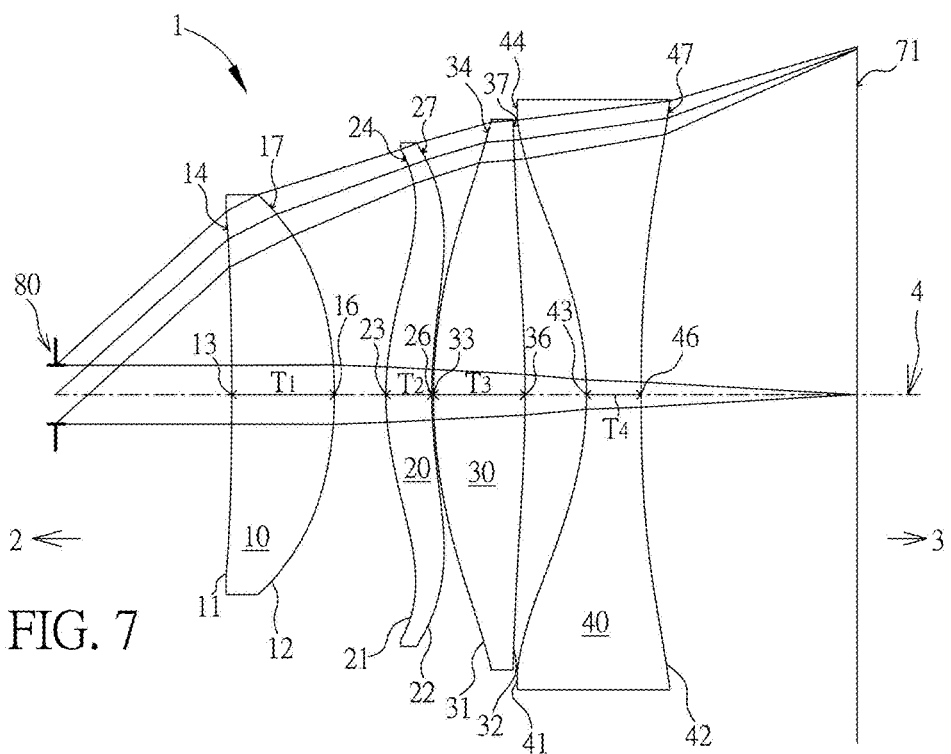
FIG. 7 illustrates a first example of the ocular optical system of the present invention.

As shown in FIG. 7, the ocular optical system 1 of four lens elements of the present invention, sequentially located from an eye side 2 (where an eye of an observer is located) to a display side 3 along an optical axis 4, has a first lens element 10, a second lens element 20, a third lens element 30, a fourth lens element 40 and a display screen 71. Generally speaking, the first lens element 10, the second lens element 20, the third lens element 30, the fourth lens element 40 may be made of a transparent plastic material but the present invention is not limited to this, and each has an appropriate refractive power. There are exclusively four lens elements, which means the first lens element 10, the second lens element 20, the third lens element 30 and the fourth lens element 40, with refractive power in the ocular optical system 1 of the present invention. The optical axis 4 is the optical axis of the entire ocular optical system 1, and the optical axis of each of the lens elements coincides with the optical axis of the ocular optical system 1.

Furthermore, a pupil of an observer 80 is disposed in an appropriate position. In FIG. 7, the pupil 80 is disposed at the eye side 2. When light emitted from the display screen 71 at the display side 3, it forms a clear and sharp image on the eye of the observer after passing through the fourth lens element 40, the third lens element 30, the second lens element 20, the first lens element 10 and the pupil 80 of the observer.

Each lens element in the ocular optical system 1 of the present invention has an eye-side surface facing toward the eye side 2 as well as a display-side surface facing toward the display side 3. For example, the first lens element 10 has an eye-side surface 11 and a display-side surface 12; the second lens element 20 has an eye-side surface 21 and a display-side surface 22; the third lens element 30 has an eye-side surface 31 and a display-side surface 32; the fourth lens element 40 has an eye-side surface 41 and a display-side surface 42. In addition, each eye-side surface and display-side surface in the ocular optical system 1 of the present invention has a part (or portion) in a vicinity of its circular periphery (circular periphery part) away from the optical axis 4 as well as a part in a vicinity of the optical axis (optical axis part) close to the optical axis 4.

Each lens element in the ocular optical system 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the total thickness of all the lens elements in the ocular optical system 1 along the optical axis 4 is ALT=T1+T2+T3+T4.

In addition, between two adjacent lens elements in the ocular optical system 1 of the present invention there may be an air gap along the optical axis 4. For example, there is an air gap G12 disposed between the first lens element 10 and the second lens element 20, an air gap G23 is disposed between the second lens element 20 and the third lens element 30, an air gap G34 is disposed between the third lens element 30 and the fourth lens element 40. Therefore, the sum of total three air gaps between adjacent lens elements from the first lens element 10 to the fourth lens element 40 along the optical axis 4 is AAG=G12+G23+G34.

In addition, a distance between the eye-side surface 11 of the first lens element 10 to the display screen 71, namely a total length of the ocular optical system 1 along the optical axis 4 is TTL; a distance between the pupil of the observer to the display screen 71 along the optical axis 4 is SL; a distance from the eye-side surface 11 of the first lens element 10 to the display-side surface 42 of the fourth lens element 40 along the optical axis 4 is TL; an effective focal length of the ocular optical system is EFL; a distance between the display-side surface 42 of the fourth lens element 40 and the display screen 71 along the optical axis 4 is G4D; a distance between the pupil of the observer to the eye-side surface 11 of the first lens element 10 along the optical axis 4 is ER (Eye relief); the exit pupil diameter, namely the diameter of the pupil of the observer is EPD (Generally, the EPD of most people are between 3-7 mm); the diagonal length of the display screen corresponding to the single pupil of the observer is DLD; the closest distance allowing the eye can focus clearly is VD (usually, it is about 250 mm for young people); the half apparent field of viewing angle of the ocular optical system, namely the half apparent field of view of the observer is ω; and the aperture value (f-number) of the ocular optical system is Fno. It is noteworthy that in this example, Fno is calculated on the principle of optical reversibility, in which the eye side is deemed as an object side, the display side is deemed as an image side, and the pupil of the observer's eye is deemed as a pupil of the emitting rays, the value of Fno of all embodiments are based on the calculation.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; an Abbe number of the first lens element 10 is υ1; an Abbe number of the second lens element 20 is υ2; an Abbe number of the third lens element 30 is υ3; and an Abbe number of the fourth lens element 40 is υ4.

First Example

Figures 8A, 8B, 8C, 8D:
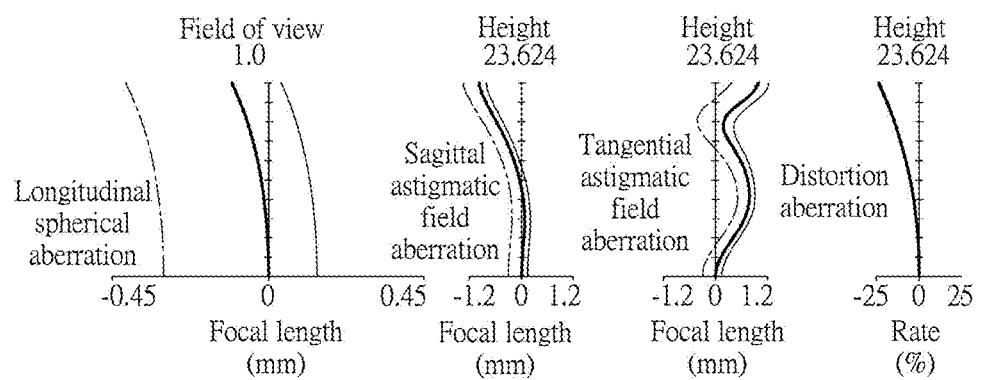
FIG. 8A illustrates the longitudinal spherical aberration of the first example.
FIG. 8B illustrates the astigmatic aberration on the sagittal direction of the first example.
FIG. 8C illustrates the astigmatic aberration on the tangential direction of the first example.
FIG. 8D illustrates the distortion aberration of the first example.

Please refer to FIG. 7 which illustrates the first example of the ocular optical system 1 of the present invention. Please refer to FIG. 8A for the longitudinal spherical aberration on the display screen 71 of the first example; please refer to FIG. 8B for the astigmatic field aberration on the sagittal direction; please refer to FIG. 8C for the astigmatic field aberration on the tangential direction, and please refer to FIG. 8D for the distortion aberration. The Y axis of the spherical aberration in each example is "field of view" for 1.0. The Y axis of the astigmatic field and the distortion in each example stands for "image height", which is 23.624 mm.

The ocular optical system 1 of the first example has four lens elements 10 to 40 with refractive power. The first lens element 10 has positive refractive power. The eye-side surface 11 facing toward the eye side 2 has a concave part 13 in the vicinity of the optical axis and a concave part 14 in a vicinity of its circular periphery. The display-side surface 12 facing toward the display side 3 has a convex part 16 in the vicinity of the optical axis and a convex part 17 in a vicinity of its circular periphery. Besides, both the eye-side surface 11 and the display-side 12 of the first lens element 10 are aspherical surfaces.

The second lens element 20 has positive refractive power. The eye-side surface 21 facing toward the eye side 2 has a convex part 23 in the vicinity of the optical axis and a concave part 24 in a vicinity of its circular periphery. The display-side surface 22 facing toward the display side 3 has a concave part 26 in the vicinity of the optical axis and a convex part 27 in a vicinity of its circular periphery. Besides, both the eye-side surface 21 and the display-side surface 22 of the second lens element 20 are aspherical surfaces.

The third lens element 30 has positive refractive power. The eye-side surface 31 facing toward the eye side 2 has a convex part 33 in the vicinity of the optical axis and a convex part 34 in a vicinity of its circular periphery. The display-side surface 32 facing toward the display side 3 has a convex part 36 in the vicinity of the optical axis and a convex part 37 in a vicinity of its circular periphery. Both the eye-side surface 31 and the display-side 32 of the third lens element 30 are aspherical surfaces.

The fourth lens element 40 has negative refractive power. The eye-side surface 41 facing toward the eye side 2 has a concave part 43 in the vicinity of the optical axis and a concave part 44 in a vicinity of its circular periphery. The display-side surface 42 facing toward the display side 3 has a concave part 46 in the vicinity of the optical axis and a concave part 47 in a vicinity of its circular periphery. Both the eye-side surface 41 and the display-side 42 of the fourth lens element 40 are aspherical surfaces.

In the first lens element 10, the second lens element 20, the third lens element 30 and the fourth lens element 40 of the optical imaging lens element 1 of the present invention, there are 8 surfaces, such as the eye-side surfaces 11/21/31/41 and the display-side surfaces 12/22/32/42. All of these surfaces are aspherical surfaces, these aspheric coefficients are defined according to the following formula:

$$Z(Y) = \frac{Y^2}{R} \Bigg/ \left(1 + \sqrt{1 - (1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance
Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the ith order.

The optical data of the first example of the ocular optical system 1 are shown in FIG. 25 while the aspheric surface data are shown in FIG. 26. In the present examples of the ocular optical system, the f-number of the entire ocular optical system is Fno, EFL is the effective focal length, w stands for the half apparent field of view which is half apparent of the field of view of the entire ocular optical system, and the unit for the curvature radius, the thickness and the focal length is in millimeters (mm). EFL is 33.992 mm. ω is 45.00 degrees. TTL is 42.653 mm. Fno is 8.50. The image height is 23.624 mm.

Second Example

Figure 9:
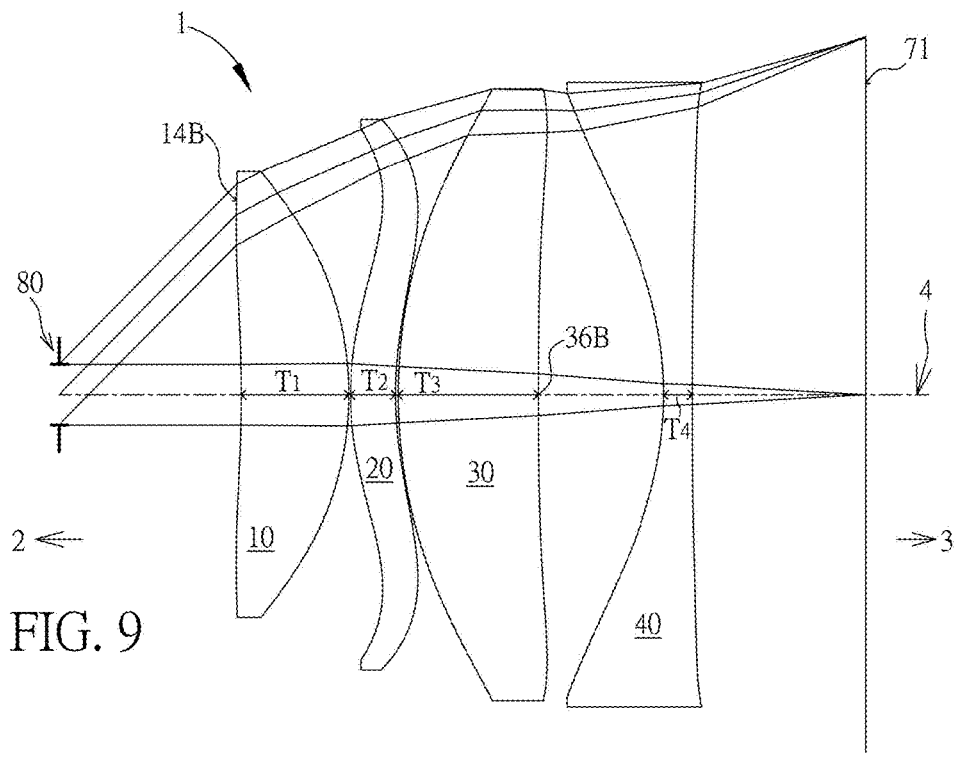
FIG. 9 illustrates a second example of the ocular optical system of four lens elements of the present invention.
Figures 10A, 10B, 10C, 10D:
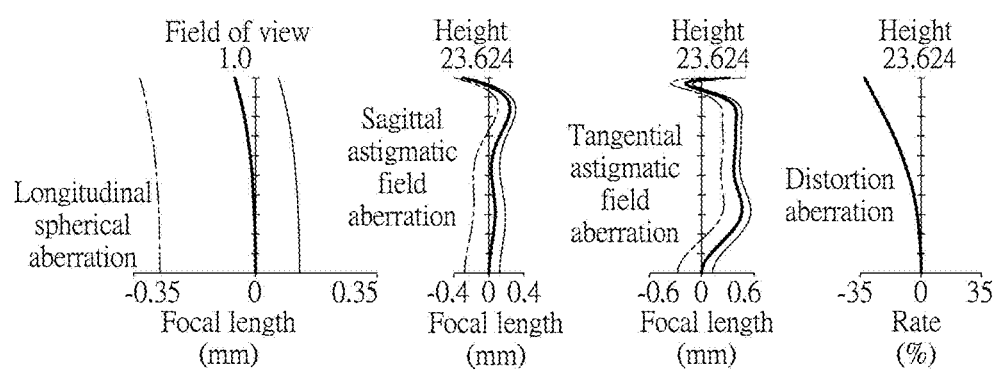
FIG. 10A illustrates the longitudinal spherical aberration of the second example.
FIG. 10B illustrates the astigmatic aberration on the sagittal direction of the second example.
FIG. 10C illustrates the astigmatic aberration on the tangential direction of the second example.
FIG. 10D illustrates the distortion aberration of the second example.

Please refer to FIG. 9 which illustrates the second example of the ocular optical system 1 of the present invention. It is noted that from the second example to the following examples, in order to simplify the figures, only the components different from what the first example has, and the basic lens elements will be labeled in figures. Other components that are the same as what the first example has, such as the eye-side surface, the display-side surface, the part in a vicinity of the optical axis and the part in a vicinity of its circular periphery will be omitted in the following examples. Please refer to FIG. 10A for the longitudinal spherical aberration on the display screen 71 of the second example, please refer to FIG. 10B for the astigmatic aberration on the sagittal direction, please refer to FIG. 10C for the astigmatic aberration on the tangential direction, and please refer to FIG. 10D for the distortion aberration. The components in the second example are similar to those in the first example, but the optical data such as the curvature radius, the refractive power, the lens thickness, the lens focal length, the aspheric surface or the back focal length in this example are different from the optical data in the first example, and in this example, eye-side surface 11 facing toward the eye side 2 has a convex part 14B in the vicinity of its periphery, display-side surface 32 facing toward the display side 3 has a concave part 36B in the vicinity of the optical axis.

The optical data of the second example of the ocular optical system are shown in FIG. 27 while the aspheric surface data are shown in FIG. 28. EFL is 34.518 mm. ω is 45.00 degrees. TTL is 41.131 mm. Fno is 8.642. The image height is 23.624 mm. In particular, the TTL of the second example is shorter than that of the first example of the present invention.

Third Example

Figure 11:
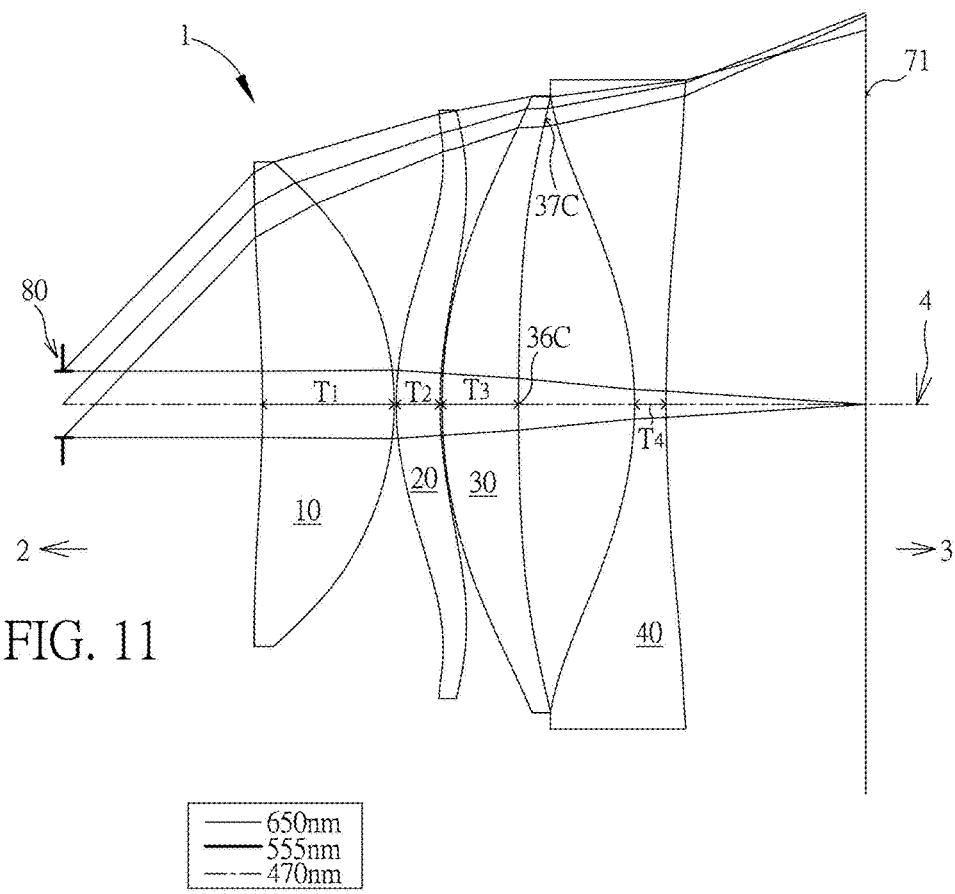
FIG. 11 illustrates a third example of the ocular optical system of four lens elements of the present invention.
Figures 12A, 12B, 12C, 12D:
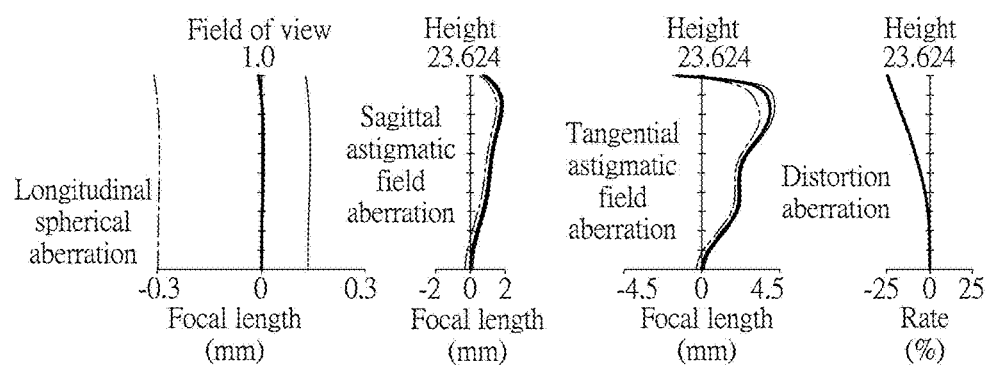
FIG. 12A illustrates the longitudinal spherical aberration of the third example.
FIG. 12B illustrates the astigmatic aberration on the sagittal direction of the third example.
FIG. 12C illustrates the astigmatic aberration on the tangential direction of the third example.
FIG. 12D illustrates the distortion aberration of the third example.

Please refer to FIG. 11 which illustrates the third example of the ocular optical system 1 of the present invention. Please refer to FIG. 12A for the longitudinal spherical aberration on the display screen 71 of the third example; please refer to FIG. 12B for the astigmatic aberration on the sagittal direction; please refer to FIG. 12C for the astigmatic aberration on the tangential direction, and please refer to FIG. 12D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, display-side surface 32 facing toward the display side 3 has a concave part 36C in the vicinity of the optical axis, display-side surface 32 facing toward the display side 3 has a concave part 37C in the vicinity of its periphery.

The optical data of the third example of the ocular optical system are shown in FIG. 29 while the aspheric surface data are shown in FIG. 30. EFL is 29.945 mm. ω is 45.00 degrees. TTL is 36.326 mm. Fno is 7.531. The image height is 23.624 mm. In particular, the TTL of the third example is shorter than that of the first example of the present invention, and the Fno of the third example is smaller than that of the first example of the present invention.

Fourth Example

Please refer to FIG. 13 which illustrates the fourth example of the ocular optical system 1 of the present invention. Please refer to FIG. 14A for the longitudinal spherical aberration on the display screen 71 of the fourth example; please refer to FIG. 14B for the astigmatic aberration on the sagittal direction; please refer to FIG. 14C for the astigmatic aberration on the tangential direction, and please refer to FIG. 14D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, display-side surface 42 facing toward the display side 3 has a convex part 47D in the vicinity of its periphery.

The optical data of the fourth example of the ocular optical system are shown in FIG. 31 while the aspheric surface data are shown in FIG. 32. EFL is 36.006 mm. ω is 45.00 degrees. TTL is 50.400 mm. Fno is 8.936. The image height is 23.624 mm. In particular, the fabrication of the fourth example is easier than the first example so the yield is better Fifth Example Please refer to FIG. 15 which illustrates the fifth example of the ocular optical system 1 of the present invention. Please refer to FIG. 16A for the longitudinal spherical aberration on the display screen 71 of the fifth example; please refer to FIG. 16B for the astigmatic aberration on the sagittal direction; please refer to FIG. 16C for the astigmatic aberration on the tangential direction, and please refer to FIG. 16D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this example, eye-side surface 11 facing toward the eye side 2 has a convex part 13E in the vicinity of the optical axis, display-side surface 42 facing toward the display side 3 has a convex part 47E in the vicinity of its periphery.

The optical data of the fifth example of the ocular optical system are shown in FIG. 33 while the aspheric surface data are shown in FIG. 34. EFL is 36.006 mm. ω is 45.00 degrees. TTL is 50.399 mm. Fno is 8.936. The image height is 23.624 mm. In particular, the image quality of the fifth example is better than that of the first example of the present invention.

Sixth Example

Figure 17:
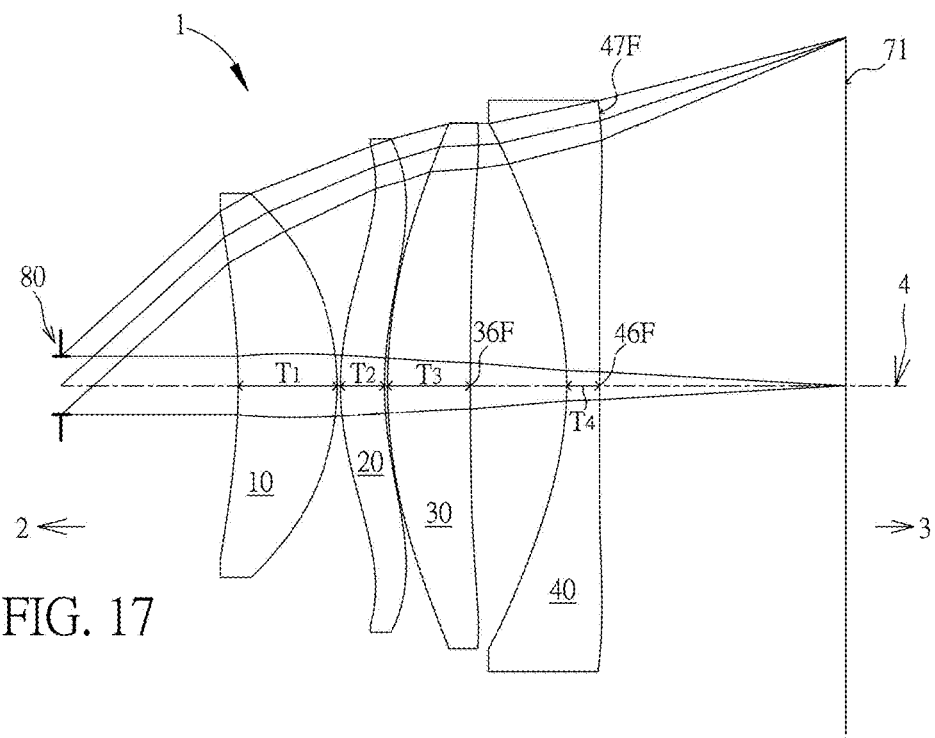
FIG. 17 illustrates a sixth example of the ocular optical system of four lens elements of the present invention.
Figures 18A, 18B, 18C, 18D:
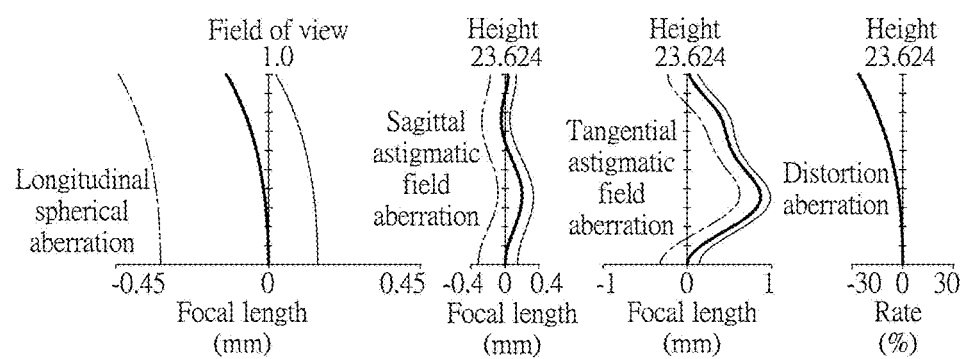
FIG. 18A illustrates the longitudinal spherical aberration plane of the sixth example.
FIG. 18B illustrates the astigmatic aberration on the sagittal direction of the sixth example.
FIG. 18C illustrates the astigmatic aberration on the tangential direction of the sixth example.
FIG. 18D illustrates the distortion aberration of the sixth example.

Please refer to FIG. 17 which illustrates the sixth example of the ocular optical system 1 of the present invention. Please refer to FIG. 18A for the longitudinal spherical aberration on the display screen 71 of the sixth example; please refer to FIG. 18B for the astigmatic aberration on the sagittal direction; please refer to FIG. 18C for the astigmatic aberration on the tangential direction, and please refer to FIG. 18D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, display-side surface 32 facing toward the display side 3 has a concave part 36F in the vicinity of the optical axis, display-side surface 42 facing toward the display side 3 has a convex part 46F in the vicinity of the optical axis, display-side surface 42 facing toward the display side 3 has a convex part 47F in the vicinity of its periphery.

The optical data of the sixth example of the ocular optical system are shown in FIG. 34 while the aspheric surface data are shown in FIG. 35. EFL is 35.032 mm. ω is 45.00 degrees. TTL is 41.223 mm. Fno is 8.761. The image height is 23.624 mm. In particular, the TTL of the sixth example is shorter than that of the first example of the present invention.

Seventh Example

Figure 19:
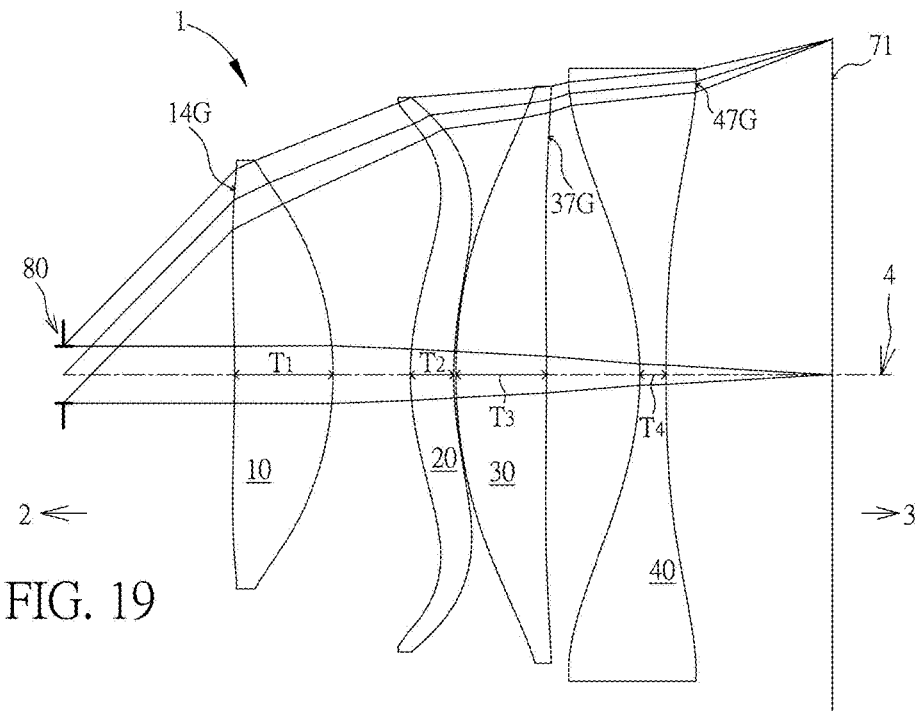
FIG. 19 illustrates a seventh example of the ocular optical system of four lens elements of the present invention.
Figures 20A, 20B, 20C, 20D:
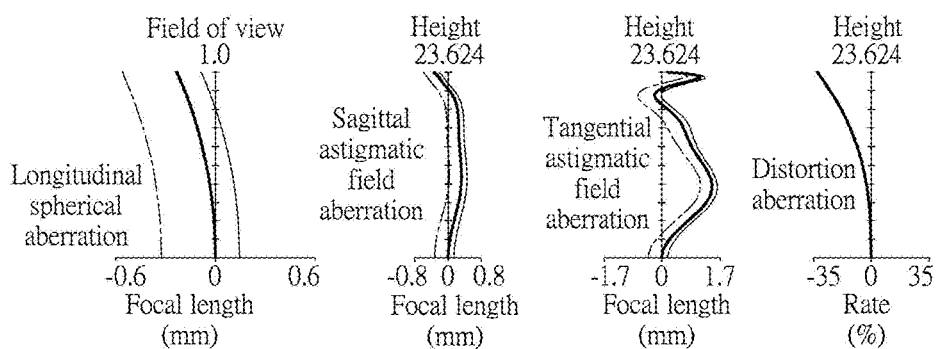
FIG. 20A illustrates the longitudinal spherical aberration plane of the seventh example.
FIG. 20B illustrates the astigmatic aberration on the sagittal direction of the seventh example.
FIG. 20C illustrates the astigmatic aberration on the tangential direction of the seventh example.
FIG. 20D illustrates the distortion aberration of the seventh example.

Please refer to FIG. 19 which illustrates the seventh example of the ocular optical system 1 of the present invention. Please refer to FIG. 20A for the longitudinal spherical aberration on the display screen 71 of the seventh example; please refer to FIG. 20B for the astigmatic aberration on the sagittal direction; please refer to FIG. 20C for the astigmatic aberration on the tangential direction, and please refer to FIG. 20D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, eye-side surface 11 facing toward the eye side 2 has a convex part 14G in the vicinity of its periphery, display-side surface 32 facing toward the display side 3 has a concave part 37G in the vicinity of its periphery, and display-side surface 42 facing toward the display side 3 has a convex part 47G in the vicinity of its periphery.

The optical data of the seventh example of the ocular optical system are shown in FIG. 37 while the aspheric surface data are shown in FIG. 38. EFL is 33.880 mm. ω is 45.00 degrees. TTL is 41.988 mm. Fno is 8.436. The image height is 23.624 mm. In particular, the TTL of the seventh example is shorter than that of the first example of the present invention, and the Fno of the seventh example is smaller than that of the first example of the present invention.

Eighth Example

Figure 21:
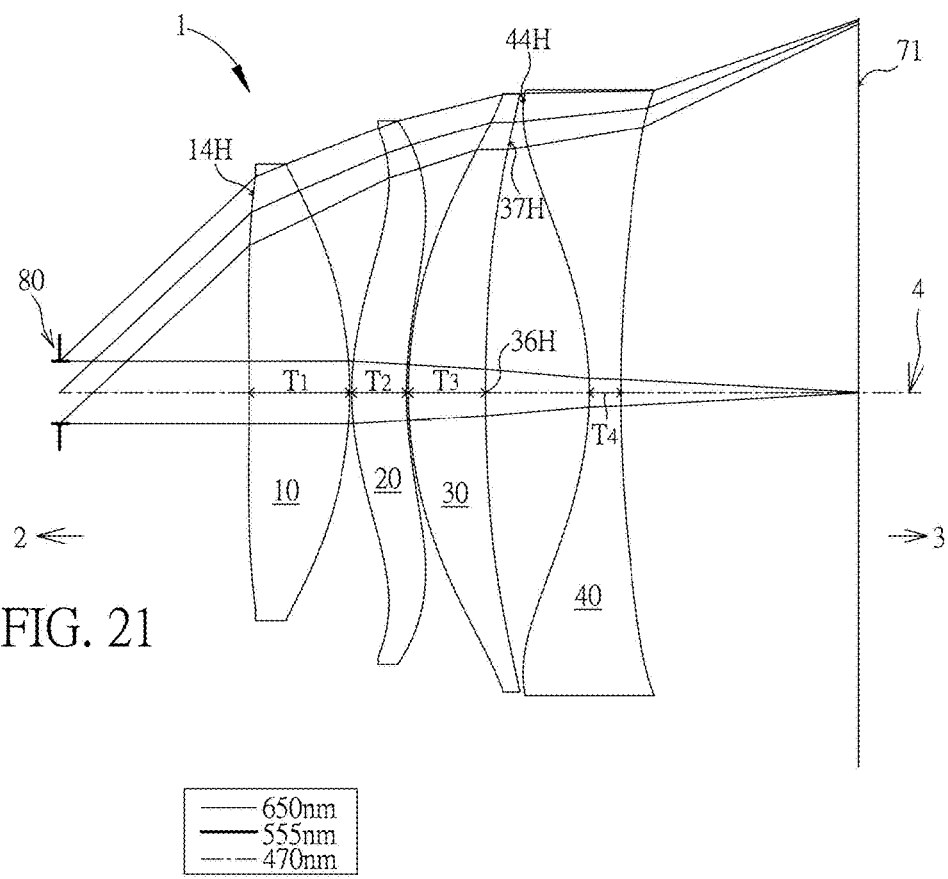
FIG. 21 illustrates an eighth example of the ocular optical system of four lens elements of the present invention.
Figures 22A, 22B, 22C, 22D:
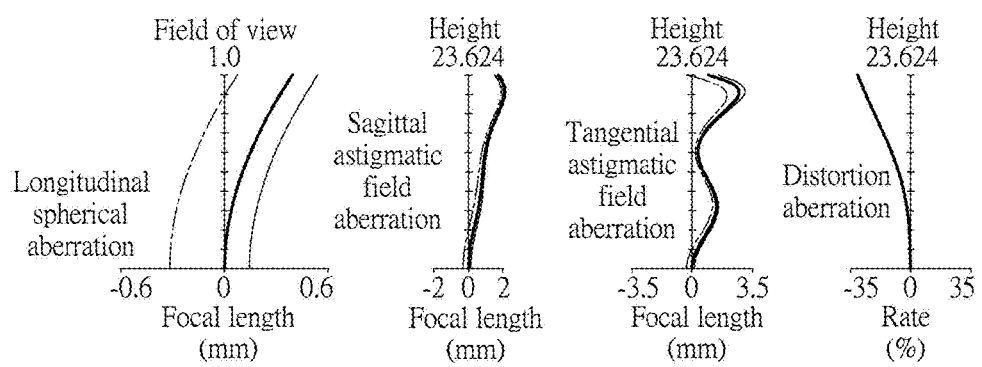
FIG. 22A illustrates the longitudinal spherical aberration plane of the eighth example.
FIG. 22B illustrates the astigmatic aberration on the sagittal direction of the eighth example.
FIG. 22C illustrates the astigmatic aberration on the tangential direction of the eighth example.
FIG. 22D illustrates the distortion aberration of the eighth example.

Please refer to FIG. 21 which illustrates the eighth example of the ocular optical system 1 of the present invention. Please refer to FIG. 22A for the longitudinal spherical aberration on the display screen 71 of the eighth example; please refer to FIG. 22B for the astigmatic aberration on the sagittal direction; please refer to FIG. 22C for the astigmatic aberration on the tangential direction, and please refer to FIG. 22D for the distortion aberration. The components in the eighth example are similar to those in the first example, but the optical data such as the curvature radius, the refractive power, the lens thickness, the lens focal length, the aspheric surface or the back focal length in this example are different from the optical data in the first example, and in this example, eye-side surface 11 facing toward the eye side 2 has a convex part 14H in the vicinity of its periphery, display-side surface 32 facing toward the display side 3 has a concave part 36H in the vicinity of the optical axis, display-side surface 32 facing toward the display side 3 has a concave part 37H in the vicinity of its periphery, and display-side surface 42 facing toward the display side 3 has a convex part 47H in the vicinity of its periphery.

The optical data of the eighth example of the ocular optical system are shown in FIG. 38 while the aspheric surface data are shown in FIG. 39. EFL is 36.035 mm. ω is 45.00 degrees. TTL is 37.672 mm. Fno is 9.179. The image height is 23.624 mm. In particular, the TTL of the eighth example is shorter than that of the first example of the present invention.

Ninth Example

Figure 23:
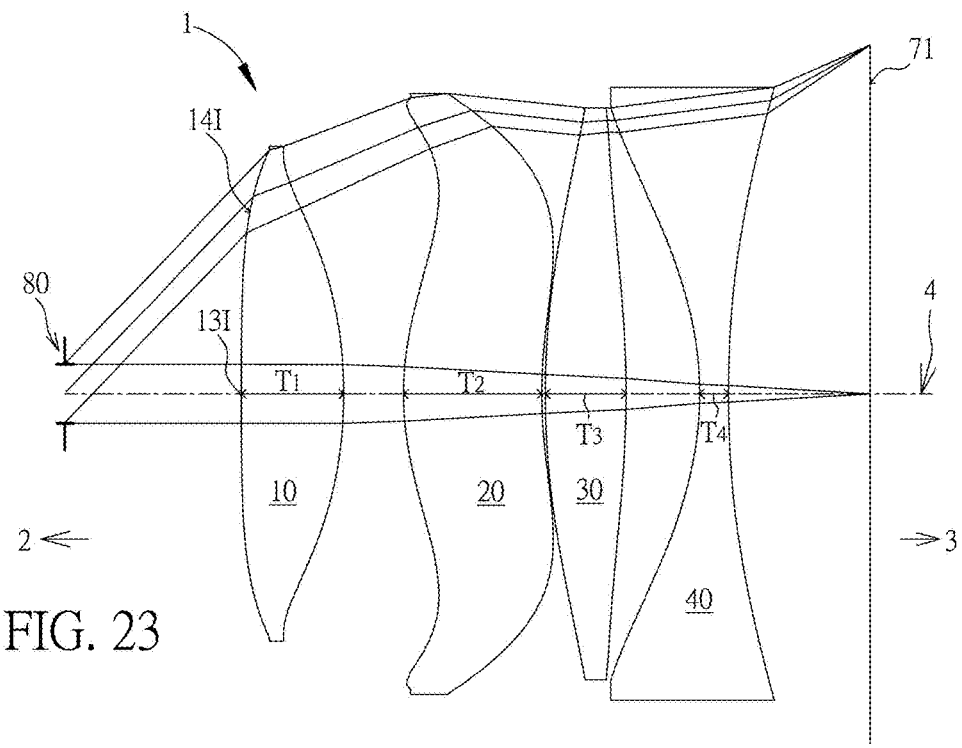
FIG. 23 illustrates a ninth example of the ocular optical system of four lens elements of the present invention.
Figures 24A, 24B, 24C, 24D:
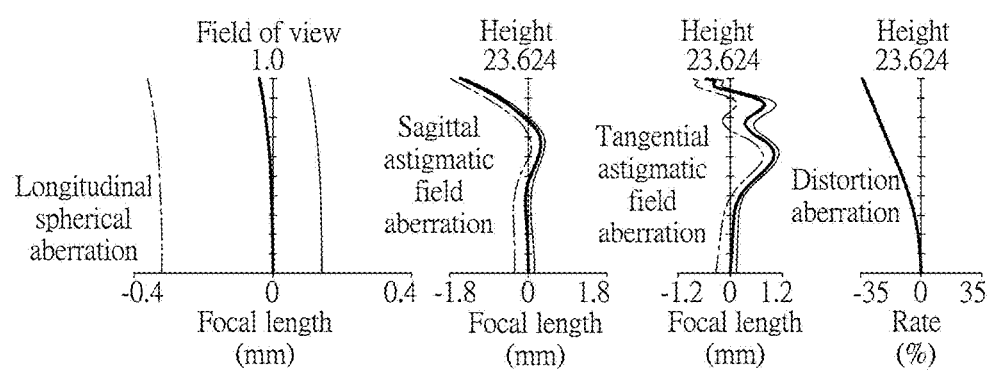
FIG. 24A illustrates the longitudinal spherical aberration plane of the ninth example.
FIG. 24B illustrates the astigmatic aberration on the sagittal direction of the ninth example.
FIG. 24C illustrates the astigmatic aberration on the tangential direction of the ninth example.
FIG. 24D illustrates the distortion aberration of the ninth example.

Please refer to FIG. 23 which illustrates the ninth example of the ocular optical system 1 of the present invention. Please refer to FIG. 24A for the longitudinal spherical aberration on the display screen 71 of the ninth example; please refer to FIG. 24B for the astigmatic aberration on the sagittal direction; please refer to FIG. 24C for the astigmatic aberration on the tangential direction, and please refer to FIG. 24D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, eye-side surface 11 facing toward the eye side 2 has a convex part 131 in the vicinity of the optical axis, eye-side surface 11 facing toward the eye side 2 has a convex part 14H in the vicinity of its periphery.

The optical data of the ninth example of the ocular optical system are shown in FIG. 41 while the aspheric surface data are shown in FIG. 42. EFL is 33.882 mm. ω is 45.00 degrees. TTL is 42.668 mm. Fno is 8.486. The image height is 23.624 mm. In particular, the Fno of the ninth example is smaller than that of the first example of the present invention.

Besides, some important ratios in each example are shown in FIG. 43.

In light of the above examples, the inventors observe at least the following features:

1. The present invention proposes finely designed vicinity of the optical axis of a lens element or finely designed vicinity of its periphery. The first lens element has a display-side surface with a convex portion in a vicinity of its periphery to concentrate light effectively.

2. The third lens element has an eye-side surface with a convex portion in a vicinity of its periphery to synergistically correct the aberration. The lens elements mentioned above match each other to synergistically decrease the length of the ocular optical system and to ensure good imaging quality.

In addition, the inventors discover that there are some better ratio ranges for different data according to the above various important ratios. Better ratio ranges help the designers to design a better optical performance and practically possible ocular optical system. For example:

1. Any one of the following conditions shows a smaller numerator when the denominator is fixed to exhibit the decrease of the total size:

$SL/ER \leq 5.20$ $TTL/ER \leq 4.60$ $ER/T4 \leq 6.50$ $G4D/T2 \leq 5.60$ $ALT/(G12+G34) \leq 2.60$ $EFL/T1 \leq 5.70$ $TTL/T1 \leq 6.9$ $TTL/T2 \leq 13.80$ $G4D/T4 \leq 7.50$ $SL/T2 \leq 21.60$ $ER/(G12+G34) \leq 2.80$ $SL/T1 \leq 7.90$ $TTL/T3 \leq 7.90$ $ALT/G34 \leq 8.10$ When the following conditions are further met, better imaging quality is possible:

$0 \leq SL/ER \leq 5.20$ $3.00 \leq TTL/ER \leq 4.60$ $0.80 \leq ER/T4 \leq 6.50$ $1.00 \leq G4D/T2 \leq 5.60$ $1.50 \leq ALT/(G12+G34) \leq 2.60$ $3.10 \leq EFL/T1 \leq 5.70$ $4.40 \leq TTL/T1 \leq 6.9$ $4.50 \leq TTL/T2 \leq 13.80$ $0.30 \leq G4D/T4 \leq 7.50$ $5.80 \leq SL/T2 \leq 21.60$ $0.90 \leq ER/(G12+G34) \leq 2.80$ $5.40 \leq SL/T1 \leq 7.90$ $4.40 \leq TTL/T3 \leq 7.90$ $2.40 \leq ALT/G34 \leq 8.10$ 2. By adjusting the relationship between the material differences of each lens element, the imaging deformation is easier to be controlled, which helps to improve the image quality and make the ocular optical system have better arrangement:

$20.00 \leq |\upsilon 1 - \upsilon 4|$, and preferably, the range is between $20.00 \leq |\upsilon 1 - \upsilon 4| \leq 64.10$ 3. In order to shorten the length of the ocular optical system, the present invention appropriately shortens the lens element's thickness and the air gaps between the lens elements. However, considering the difficulty of lens elements assembly process while maintained in good image quality, the thickness of each lens element and the air gaps between the lens elements should be designed to match each other. If the following conditions can be satisfied, the ocular optical system will have better arrangement:

ER/T4≤6.50, and preferably, the range is between 0.80≤ER/T4≤6.50; G4D/T2≤5.60, and preferably, the range is between 1.00≤G4D/T2≤5.60; ALT/(G1+G3)≤2.60, and preferably, the range is between 1.50≤ALT/(G1+G3)≤2.60;

G4D/T4≤7.50, and preferably, the range is between 0.30≤G4D/T4≤7.50; ER/(G1+G3)≤2.80, and preferably, the range is between 0.90≤ER/(G1+G3)≤2.80;

ALT/G3≤8.10, and preferably, the range is between 2.40≤ALT/G3≤8.10.

4. Reducing the EFL helps to enlarge the viewing angle, so EFL tends to be small. If the following condition is satisfied, the total length of the ocular optical system can be decreased, and also helps to enlarge the viewing angle:

EFL/T1≤5.70, and preferably, the range is between 3.10≤EFL/T1≤5.70.

5. When the following conditions can be satisfied, each thickness of the lens element and each air gap is kept in preferred ranges:

SL/ER≤5.20, and preferably, the range is between 0.00≤SL/ER≤5.20; TTL/ER≤4.60, and preferably, the range is between 3.00≤TTL/ER≤4.60; TTL/T1≤6.90, and preferably, the range is between 4.40≤TTL/T1≤6.90; TTL/T2≤13.80, and preferably, the range is between 4.50≤TTL/T2≤13.80; SL/T2≤21.60, and preferably, the range is between 5.80≤SL/T2≤21.60; SL/T1≤7.90, and preferably, the range is between 5.40≤SL/T1≤7.90; TTL/T3≤7.90, and preferably, the range is between 4.40≤TTL/T3≤7.90.

Good ratio helps to control the lens thickness or the air gaps to maintain a suitable range and keeps a lens element from being too thick to facilitate the reduction of the overall size or too thin to assemble the ocular optical system.

The above limitations may be properly combined at the discretion of persons who practice the present invention and they are not limited as shown above. In light of the unpredictability of the ocular optical system, the present invention suggests the above principles to appropriately reduce the length of the lens element set, to have better F number, to have better imaging quality or to have better assembling yield to overcome the shortcomings of prior art.

The above-mentioned one or more conditions may be properly combined in the embodiments. In addition to the above ratios, the curvatures of each lens element or multiple lens elements may be fine-tuned to result in more fine structures to enhance the performance or the resolution. For example, the first object-side surface 11 of the first lens element 10 may additionally have a convex part in the vicinity of the optical axis. The above limitations may be properly combined in the embodiments without causing inconsistency.

In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths are pretty close to one another, which means the present invention is able to concentrate light of the three representing different wavelengths so that the aberration is greatly improved. Given the above, the present invention provides outstanding imaging quality by the above designs of each lens element as well as the excellent synergies gained from the combinations of lens elements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ocular optical system, applied to imaging rays from a display screen into a pupil of an observer via said ocular optical system, with an eye side facing toward said pupil of the observer and with a display side facing toward said display screen said ocular optical system from said eye side toward said display side in order along an optical axis comprising: a first lens element, a second lens element, a third lens element and a fourth lens element, said first lens element to said fourth lens element each having an eye-side surface facing toward said eye side and allowing the imaging light to pass through, and as well as a display-side surface facing toward said display side and allowing the imaging light to pass through, wherein:

said first lens element has a display-side surface with a convex portion in a vicinity of its periphery;

said third lens element has an eye-side surface with a convex portion in a vicinity of its periphery;

the ocular optical system does not include any lens element with refractive power other than said first lens element, said second lens element, said third lens element and said fourth lens element, υ1 is an Abbe number of the first lens element, υ4 is an Abbe number of the fourth lens element, SL is a distance between said pupil of said observer and the display screen, T2 is a thickness of said second lens element along the optical axis, ALT is a total thickness of all four lens elements, G34 is an air gap between said third lens element and said fourth lens element along said optical axis, and the ocular optical system satisfies the relationships: 20.00≤|υ1−υ4|, SL/T2≤21.60 and ALT/G34≤8.10.

2. The ocular optical system of claim 1, wherein ER is a distance between said pupil of said observer and an eye-side surface of said first lens element, and the ocular optical system satisfies the relationship SL/ER≤5.20.

3. The ocular optical system of claim 1, wherein TTL is a distance between an eye-side surface of said first lens element and the display screen, ER is a distance between said pupil of said observer to an eye-side surface of said first lens element, and the ocular optical system satisfies the relationship TTL/ER≤4.60.

4. The ocular optical system of claim 1, wherein ER is a distance between said pupil of said observer and an eye-side surface of said first lens element, T4 is a thickness of said fourth lens element along the optical axis, and the ocular optical system satisfies the relationship ER/T4≤6.50.

5. The ocular optical system of claim 1, wherein G4D is a distance between a display-side surface of said fourth lens element and the display screen along the optical axis, and the ocular optical system satisfies the relationship G4D/T2≤5.60.

6. The ocular optical system of claim 1, wherein G12 is an air gap between said first lens element and said second lens element along said optical axis, and the ocular optical system satisfies the relationship ALT/(G12+G34)≤2.60.

7. The ocular optical system of claim 1, wherein EFL is an effective focal length of said ocular optical system, T1 is a thickness of said first lens element along the optical axis, and the ocular optical system satisfies the relationship EFL/T1≤5.70.

8. The ocular optical system of claim 1, wherein TTL is a distance between an eye-side surface of said first lens element and the display screen, T1 is a thickness of said first lens element along the optical axis, and the ocular optical system satisfies the relationship TTL/T1≤6.90.

9. The ocular optical system of claim 1, wherein TTL is a distance between an eye-side surface of said first lens element and the display screen, and the ocular optical system satisfies the relationship TTL/T2≤13.80.

10. An ocular optical system, applied to imaging rays from a display screen into a pupil of an observer via said ocular optical system, with an eye side facing toward said pupil of the observer and with a display side facing toward said display screen said ocular optical system from said eye side toward said display side in order along an optical axis comprising: a first lens element, a second lens element, a third lens element and a fourth lens element, said first lens element to said fourth lens element each having an eye-side surface facing toward said eye side and allowing the imaging light to pass through, and as well as a display-side surface facing toward said display side and allowing the imaging light to pass through, wherein:
  said first lens element has a display-side surface with a convex portion in a vicinity of its periphery;
  said third lens element has positive refractive power;
  the ocular optical system does not include any lens element with refractive power other than said first lens element, said second lens element, said third lens element and said fourth lens element, υ1 is an Abbe number of the first lens element, υ4 is an Abbe number of the fourth lens element, SL is a distance between said pupil of said observer and the display screen, T2 is a thickness of said second lens element along the optical axis, ALT is a total thickness of all four lens elements, G34 is an air gap between said third lens element and said fourth lens element along said optical axis, and the ocular optical system satisfies the relationships: 20.00≤|υ1−υ4|, SL/T2≤21.60 and ALT/G34≤8.10.

11. The ocular optical system of claim 10, wherein ER is a distance between said pupil of said observer and an eye-side surface of said first lens element, and the ocular optical system satisfies the relationship SL/ER≤5.20.

12. The ocular optical system of claim 10, wherein TTL is a distance between an eye-side surface of said first lens element and the display screen, ER is a distance between said pupil of said observer to an eye-side surface of said first lens element, and the ocular optical system satisfies the relationship TTL/ER≤4.60.

13. The ocular optical system of claim 10, wherein G4D is a distance between a display-side surface of said fourth lens element and the display screen along the optical axis, T4 is a thickness of said fourth lens element along the optical axis, and the ocular optical system satisfies the relationship G4D/T4≤7.50.

14. The ocular optical system of claim 10, wherein ER is a distance between said pupil of said observer and an eye-side surface of said first lens element, G12 is an air gap between said first lens element and said second lens element along said optical axis, and the ocular optical system satisfies the relationship ER/(G12+G34)≤2.80.

15. The ocular optical system of claim 10, wherein T1 is a thickness of said first lens element along the optical axis, and the ocular optical system satisfies the relationship SL/T1≤7.90.

16. The ocular optical system of claim 10, wherein TTL is a distance between an eye-side surface of said first lens element and the display screen, T3 is a thickness of said third lens element along the optical axis, and the ocular optical system satisfies the relationship TTL/T3≤7.90.

* * * * *